(12) United States Patent
Hruska et al.

(10) Patent No.: US 9,287,800 B2
(45) Date of Patent: Mar. 15, 2016

(54) SYSTEMS AND METHODS FOR NON-THERMAL PLASMA OVER LIQUID DIRECT ION INJECTION

(71) Applicant: Walter Buchanan, Olathe, KS (US)

(72) Inventors: Chris Hruska, Blue Springs, MO (US); Walter Buchanan, Olathe, KS (US); David Forsee, Kansas City, MO (US)

(73) Assignee: Walter Buchanan, Olathe, KS (US)

( * ) Notice: Subject to any disclaimer, the term of this patent is extended or adjusted under 35 U.S.C. 154(b) by 484 days.

(21) Appl. No.: 13/782,874

(22) Filed: Mar. 1, 2013

(65) Prior Publication Data
US 2014/0246364 A1    Sep. 4, 2014

(51) Int. Cl.
C02F 1/46        (2006.01)
H02M 7/44       (2006.01)
C02F 1/78        (2006.01)
C01B 13/11      (2006.01)
C02F 1/72        (2006.01)

(52) U.S. Cl.
CPC ............... *H02M 7/44* (2013.01); *C01B 13/11* (2013.01); *C02F 1/78* (2013.01); *C01B 2201/22* (2013.01); *C01B 2201/32* (2013.01); *C01B 2201/64* (2013.01); *C01B 2201/90* (2013.01); *C02F 1/727* (2013.01); *C02F 2209/40* (2013.01); *C02F 2303/04* (2013.01); *C02F 2305/023* (2013.01)

(58) Field of Classification Search
CPC ............ H02M 7/44; C02F 1/78; C02F 1/727; C02F 2209/40; C02F 2203/04; C02F 2305/023; C01B 13/11; C01B 2201/22; C01B 2201/32; C01B 2201/64; C01B 2201/90
See application file for complete search history.

(56) References Cited

U.S. PATENT DOCUMENTS

| | | |
|---|---|---|
| 2008/0292497 A1 | 11/2008 | Vangeneugden et al. |
| 2010/0219757 A1 | 9/2010 | Benzerrouk et al. |
| 2011/0284437 A1 | 11/2011 | Johnson |
| 2012/0020844 A1 | 1/2012 | Foret |
| 2012/0250370 A1 | 10/2012 | Taniguchi et al. |

*Primary Examiner* — Kishor Mayekar
(74) *Attorney, Agent, or Firm* — Law Office of Mark Brown, LLC; Mark E. Brown

(57) ABSTRACT

A system for performing ozone water treatment comprises a voltage supply circuit and a plasma eductor reactor. The voltage supply circuit includes an H-bridge controller and driver, a transformer, and an output port. The H-bridge controller and driver are configured to switch the electrical polarity of a pair of terminals. A primary of the transformer is connected to the H-bridge driver and controller. A secondary of the transformer connects in parallel with a first capacitor and in series with an inductor and a second capacitor. The output port connects in parallel with the second capacitor. The plasma eductor reactor includes an electric field generator, a flow spreader, and a diffuser. The electric field generator includes a pair of electrodes that generate an electric field. The flow spreader supplies a stream of oxygen. The diffuser supplies a stream of water. The streams of water and oxygen pass through the electric field.

19 Claims, 11 Drawing Sheets

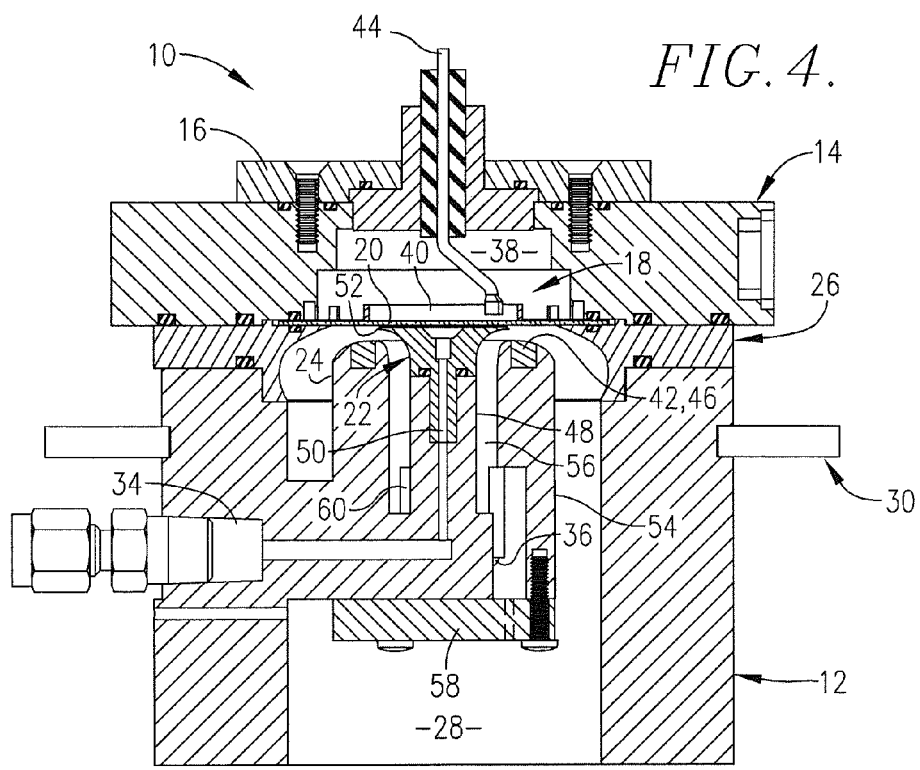
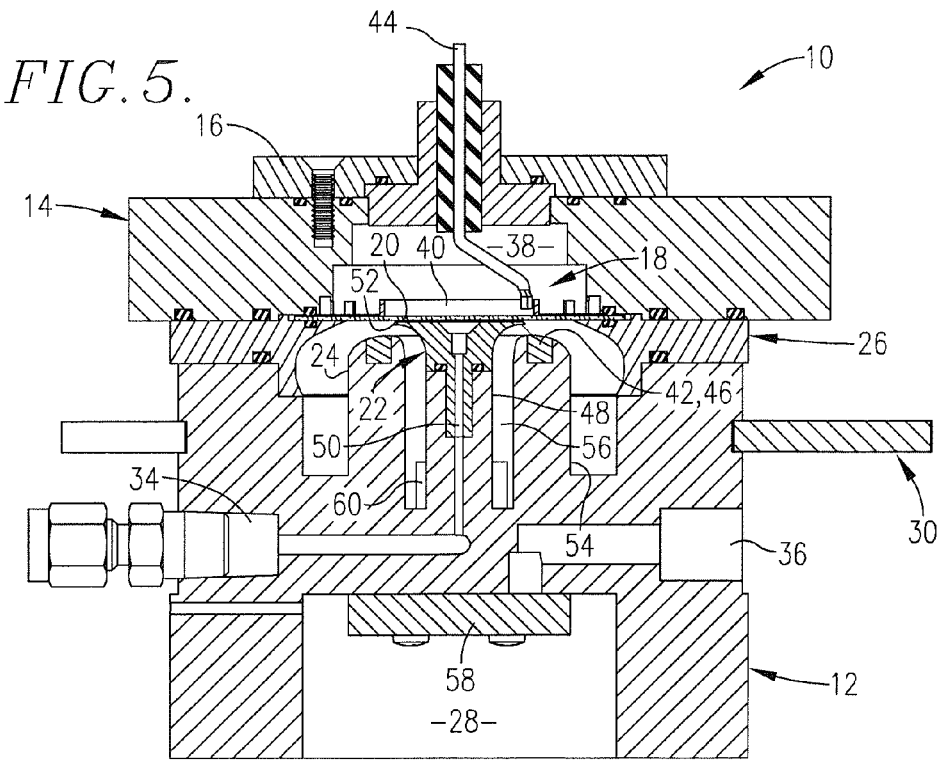

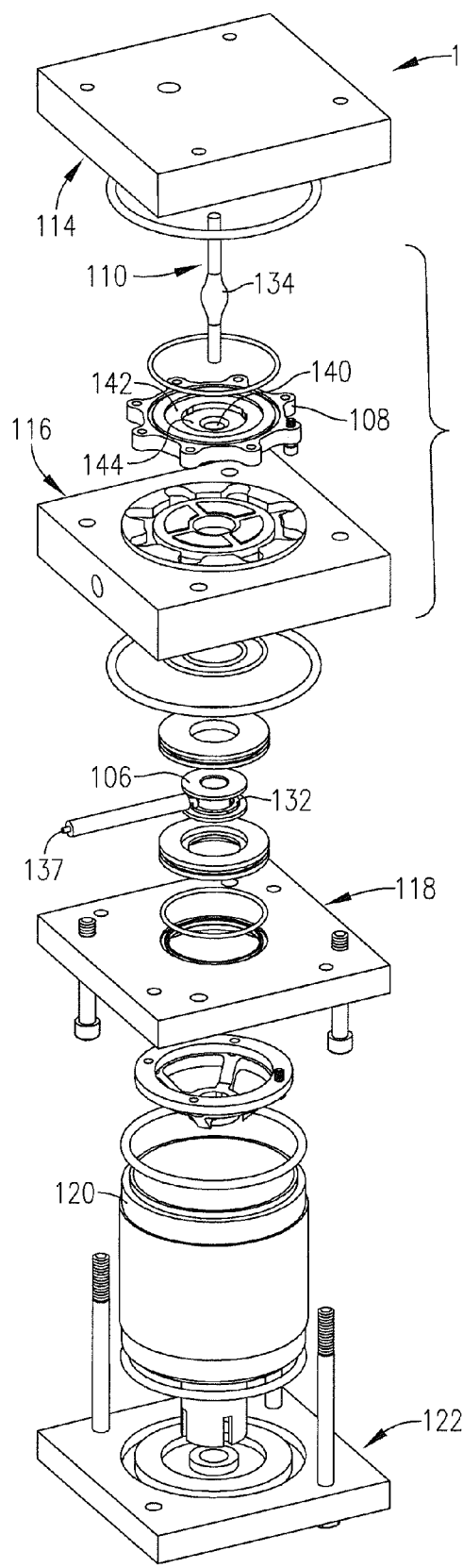
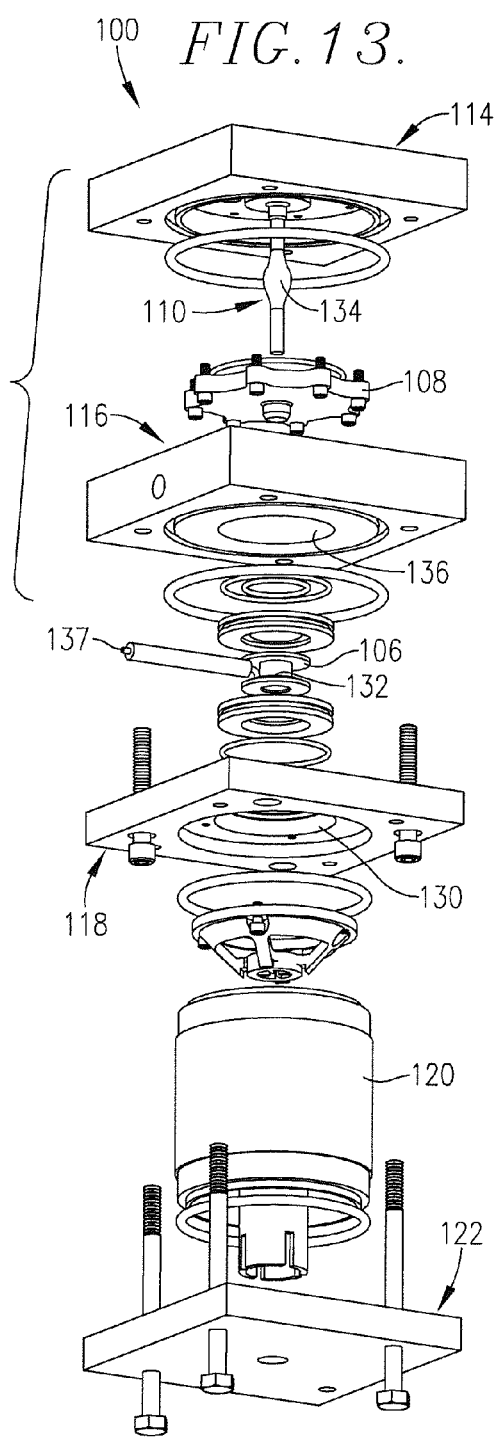
FIG. 12.
FIG. 13.

SYSTEMS AND METHODS FOR NON-THERMAL PLASMA OVER LIQUID DIRECT ION INJECTION

BACKGROUND OF THE INVENTION

1. Field of the Invention

Embodiments of the current invention relate to plasma reactors and methods and systems that utilize plasma reactors.

2. Description of the Related Art

Plasma reactors may include at least two electrodes which are spaced apart. Typically, a voltage difference is applied to the electrodes and an electric field is established between them. A stream of gas may be introduced to the space between the electrodes such that it passes through the electric field. Exposure to the electric field generally ionizes the gas and creates a plasma. If a stream of liquid is also introduced to the space between the electrodes, then the plasma may be injected into the liquid as it passes through the electric field. Plasma injection into liquid may be utilized for applications such as: in-line liquid hydrocarbon fuel reforming for hydrogen enrichment to improve the fuel economy of internal combustion engines; nitrogen fixing by direct nitrogen ion injection into water; destruction of high molecular weight hydrocarbons (proteins and pharmaceuticals) in drinking water; ammonia/nitrate sequestering for treatment of high nitrate content water; demineralization (water softening) for consumer and industrial markets; and other similar applications.

SUMMARY OF THE INVENTION

A first embodiment of the current invention provides a plasma eductor reactor comprising a housing, an electric field generator, a flow spreader, and a diffuser. The housing may include an internal reactor chamber. The electric field generator may include a first electrode and a spaced apart second electrode and may generate an electric field therebetween. The first and second electrodes each may have an annular shape of roughly the same size. Together, the first and second electrodes may produce a cylindrical electrical field. The plasma educator reactor may also include a dielectric element positioned between the first and second electrodes, adjacent to the first electrode. The flow spreader may supply a stream of gas to the reactor chamber and may be positioned within the reactor chamber concentrically with the first and second electrodes. The diffuser may supply a stream of liquid to the reactor chamber and may be positioned within the reactor chamber concentrically with the first and second electrodes and the flow spreader. The stream of liquid and the stream of gas may flow adjacent one another radially outward from the center of the reactor chamber and pass through the electric field.

A second embodiment of the current invention provides a plasma eductor reactor comprising a housing, a liquid passageway, a gas passageway, an electric field generator, and a diffuser. The housing may include an internal reactor chamber. The liquid passageway may supply a stream of liquid to a first end of the reactor chamber. The gas passageway may supply a stream of gas to the first end of the reactor chamber. The electric field generator may include a first electrode and a spaced apart second electrode and may generate an electric field therebetween. The first electrode may have an annular shape, and the second electrode may have a circular shape with a diameter smaller than an inner diameter of the first electrode such that the second electrode is positioned within the interior of the first electrode. The plasma educator reactor may also include a dielectric element positioned between the first and second electrodes, adjacent to the first electrode. The diffuser may possess an elongated cylindrical shape having a circumferential sidewall with an outer surface. A first end of the diffuser is positioned at the first end of the reactor chamber. The stream of liquid flows axially away from the first end of the reactor chamber along the outer surface of the sidewall and the stream of gas flows adjacent to the stream of liquid as both streams pass through the electric field.

A third embodiment of the current invention provides a voltage supply circuit comprising an H-bridge driver, an H-bridge controller, a transformer, an impedance matching network, an inductor, and an output port. The H-bridge driver may switch the electrical polarity of a pair of terminals. The H-bridge controller may send a control signal to the H-bridge driver to control the switching of the electrical polarity. A primary of the transformer may be connected to the terminals of the H-bridge driver. A secondary of the transformer may be connected in parallel with the impedance matching network. The inductor may be connected in series with the secondary. The output port may be connected to the inductor for delivering a voltage to a load.

A fourth embodiment of the current invention provides a voltage supply circuit comprising a voltage supply circuit comprising a driver, a controller, a transformer, an impedance matching network, an inductor, and an output port. The driver may switch the electrical polarity of a pair of terminals. The controller may send a control signal to the driver to control the switching of the electrical polarity. A primary of the transformer may be connected to the terminals of the driver. A secondary of the transformer may be connected in parallel with the impedance matching network. The inductor may be connected in series with the secondary. The output port may be connected to the inductor for delivering a voltage to a load.

A fifth embodiment of the current invention provides a system for performing ozone water treatment. The system may comprise a voltage supply circuit and a plasma eductor reactor. The voltage supply circuit may comprise an H-bridge driver, an H-bridge controller, a transformer, a first capacitor, an inductor, a second capacitor, and an output port. The H-bridge driver may switch the electrical polarity of a pair of terminals. The H-bridge controller may send a control signal to the H-bridge driver to control the switching of the electrical polarity. A primary of the transformer may be connected to the terminals of the H-bridge driver. A secondary of the transformer may be connected in parallel with the first capacitor and in series with the inductor and the second capacitor. The output port may be connected in parallel with the second capacitor and may deliver a voltage to a load.

The plasma eductor reactor may comprise a housing, an electric field generator, a flow spreader, and a diffuser. The housing may include an internal reactor chamber. The electric field generator may include a first electrode and a spaced apart second electrode and may generate an electric field therebetween. The first and second electrodes may be connected to the output port of the voltage supply circuit and each may have an annular shape of roughly the same size. Together, the first and second electrodes may produce a cylindrical electrical field. The plasma educator reactor may also include a dielectric element positioned between the first and second electrodes, adjacent to the first electrode. The flow spreader may supply a stream of oxygen to the reactor chamber and may be positioned within the reactor chamber concentrically with the first and second electrodes. The diffuser may supply a stream of water to the reactor chamber and may be positioned within the reactor chamber concentrically with the first and second electrodes and the flow spreader. The stream of water and the stream of oxygen may flow adjacent one another radially outward from the center of the reactor chamber and pass through the electric field.

A sixth embodiment of the current invention provides a system for performing a treatment of a liquid. The system may comprise a voltage supply circuit and a plasma eductor reactor. The voltage supply circuit may comprise a driver, a controller, a transformer, a first capacitor, an inductor, a second capacitor, and an output port. The driver may switch the electrical polarity of a pair of terminals. The controller may send a control signal to the driver to control the switching of the electrical polarity. A primary of the transformer may be connected to the terminals of the driver. A secondary of the transformer may be connected in parallel with the first capacitor and in series with the inductor and the second capacitor. The output port may be connected in parallel with the second capacitor and may deliver a voltage to a load.

The plasma eductor reactor may comprise a housing, an electric field generator, a flow spreader, and a diffuser. The housing may include an internal reactor chamber. The electric field generator may include a first electrode and a spaced apart second electrode and may generate an electric field therebetween. The first and second electrodes may be connected to the output port of the voltage supply circuit and each may have an annular shape of roughly the same size. Together, the first and second electrodes may produce a cylindrical electrical field. The plasma eductor reactor may also include a dielectric element positioned between the first and second electrodes, adjacent to the first electrode. The flow spreader may supply a stream of gas to the reactor chamber and may be positioned within the reactor chamber concentrically with the first and second electrodes. The diffuser may supply a stream of water to the reactor chamber and may be positioned within the reactor chamber concentrically with the first and second electrodes and the flow spreader. The stream of water and the stream of gas may flow adjacent one another radially outward from the center of the reactor chamber and pass through the electric field.

A seventh embodiment of the current invention provides a method of creating a plasma treated liquid. The method comprises the steps of allowing a liquid to flow into a reactor chamber so as to create a low pressure area within the reactor chamber adjacent to the flow of the liquid, introducing a gas into the reactor chamber in the low pressure area to create a gas layer adjacent to the flow of the liquid, exposing the gas layer to an electric field to ionize the gas and create a layer of plasma above the liquid, and exposing the plasma and the liquid to the electric field.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 4 is a sectional view of the plasma eductor reactor of FIG. 1 cut along the line 4-4 of FIG. 3;

FIG. 5 is a sectional view of the plasma eductor reactor of FIG. 1 cut along the line 5-5 of FIG. 3;

FIG. 12 is an exploded view of the plasma eductor reactor of FIG. 8 from an upper perspective;

FIG. 13 is an exploded view of the plasma eductor reactor of FIG. 8 from a lower perspective;

Figure 1:
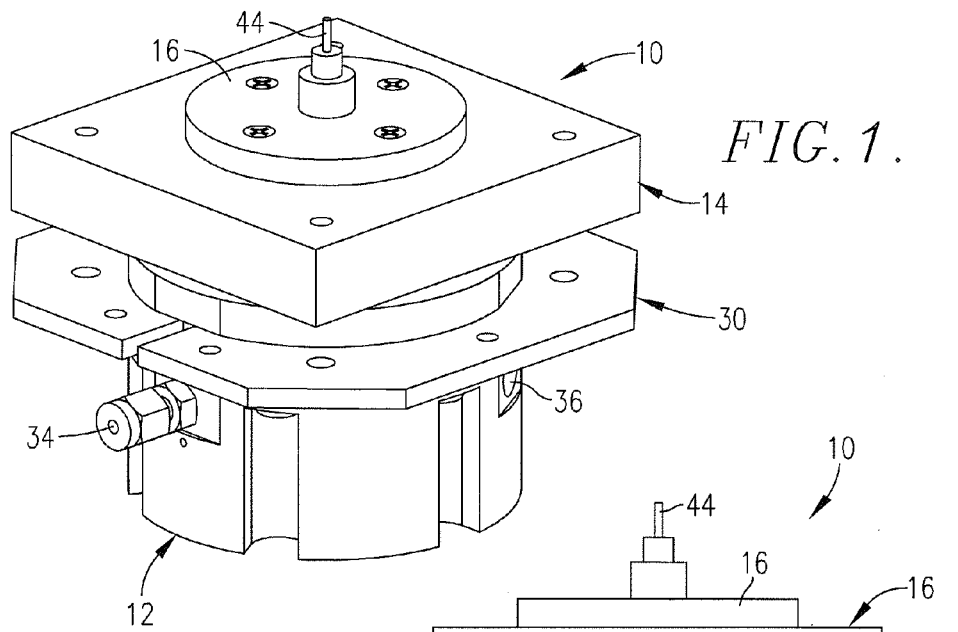
FIG. 1 is an isometric view of a plasma eductor reactor constructed in accordance with various embodiments of the current invention.
Figure 2:
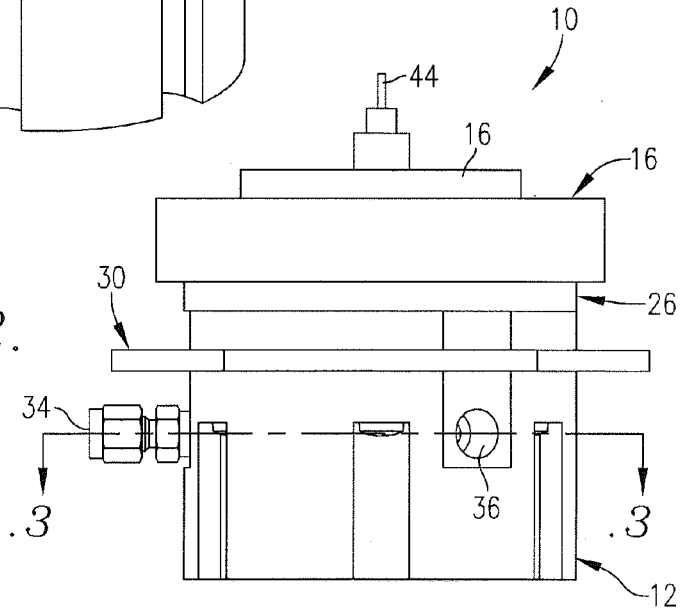
FIG. 2 is a side view of the plasma eductor reactor of FIG. 1.
Figure 3:
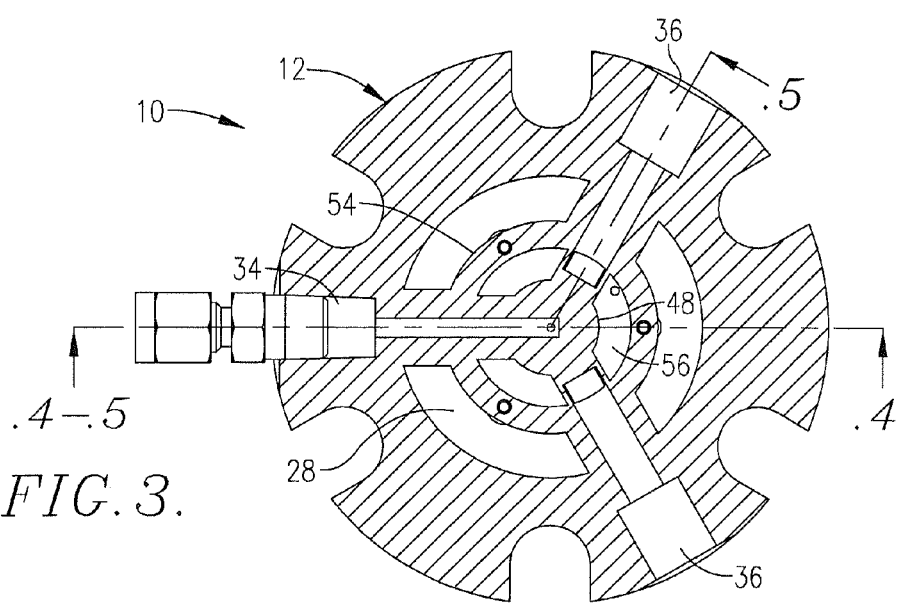
FIG. 3 is a sectional view of the plasma eductor reactor of FIG. 1 cut along the line 3-3 of FIG. 2.
Figure 6:
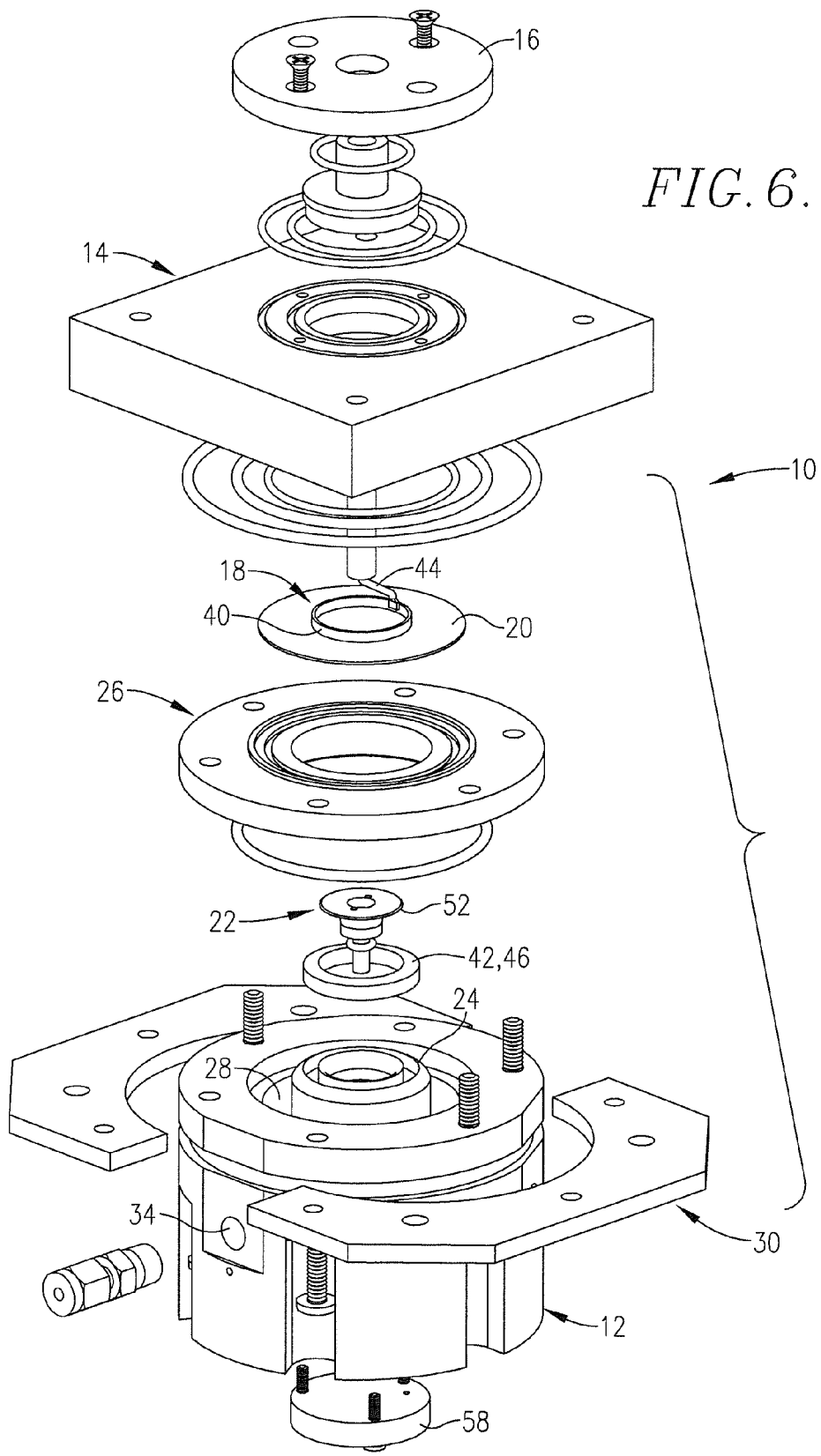
FIG. 6 is an exploded view of the plasma eductor reactor of FIG. 1.
Figure 7:
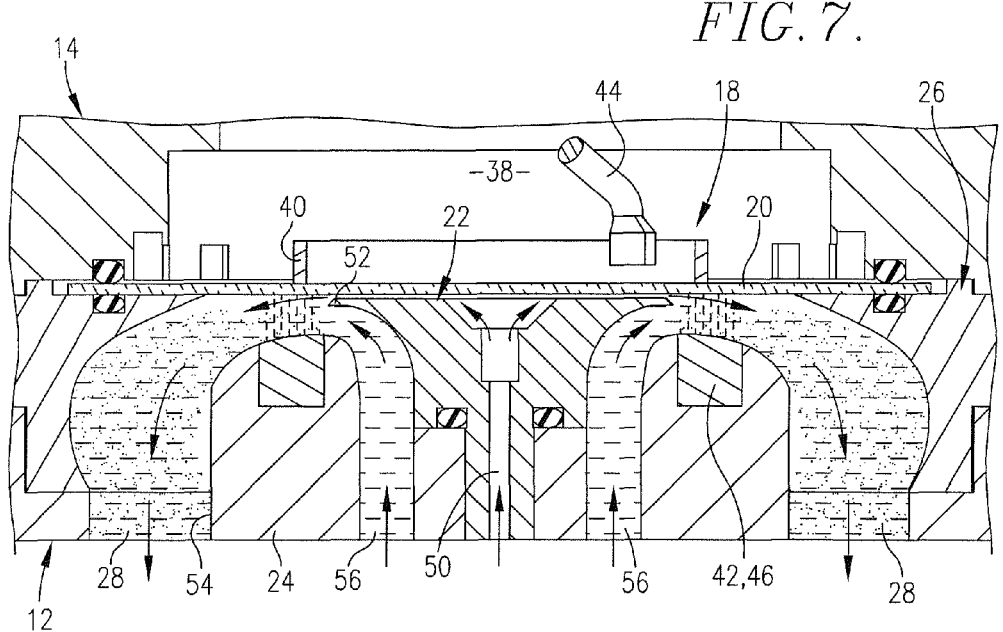
FIG. 7 is an enlarged view of the sectional view of the plasma eductor reactor from FIG. 4 highlighting an upper portion of a reactor chamber.
Figure 8:
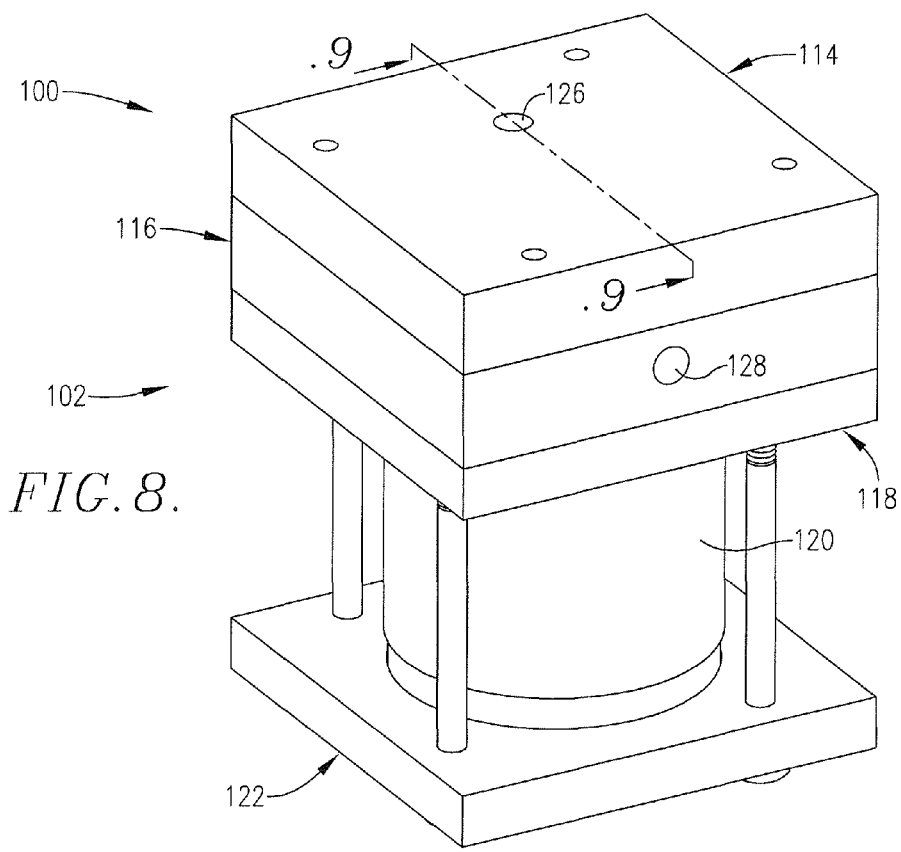
FIG. 8 is an isometric view of a second embodiment of the plasma eductor reactor.
Figure 9:
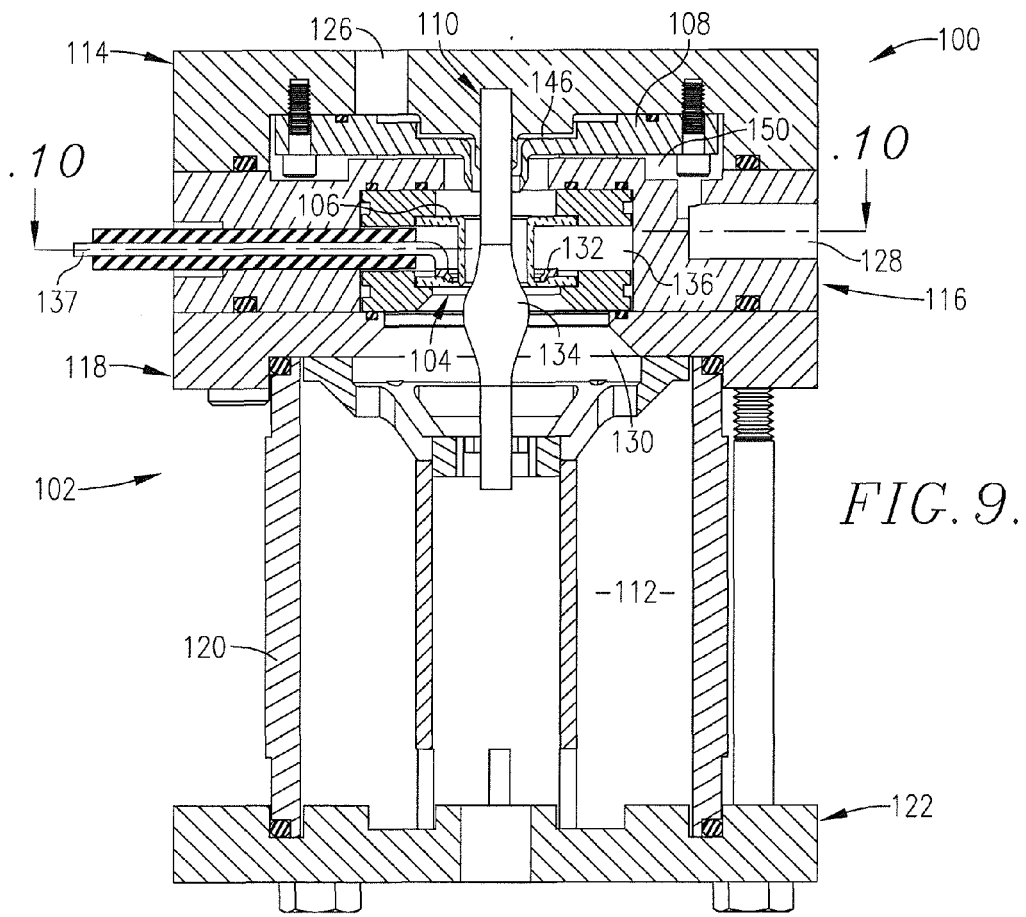
FIG. 9 is a sectional view of the plasma eductor reactor of FIG. 8 cut along the line 9-9 of FIG. 8.
Figure 10:
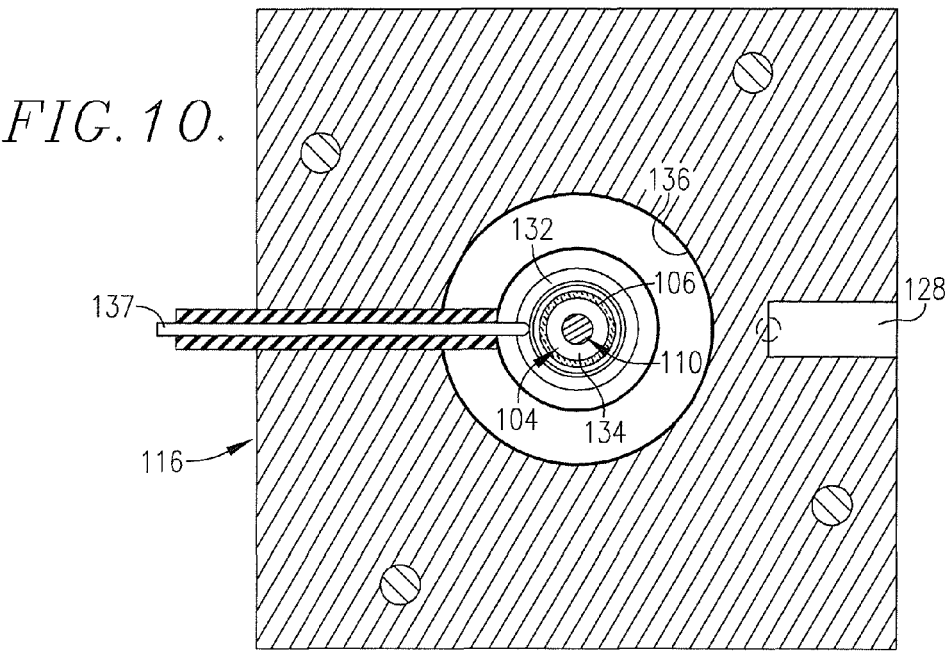
FIG. 10 is a sectional view of the plasma eductor reactor of FIG. 8 cut along the line 10-10 of FIG. 9.
Figure 11:
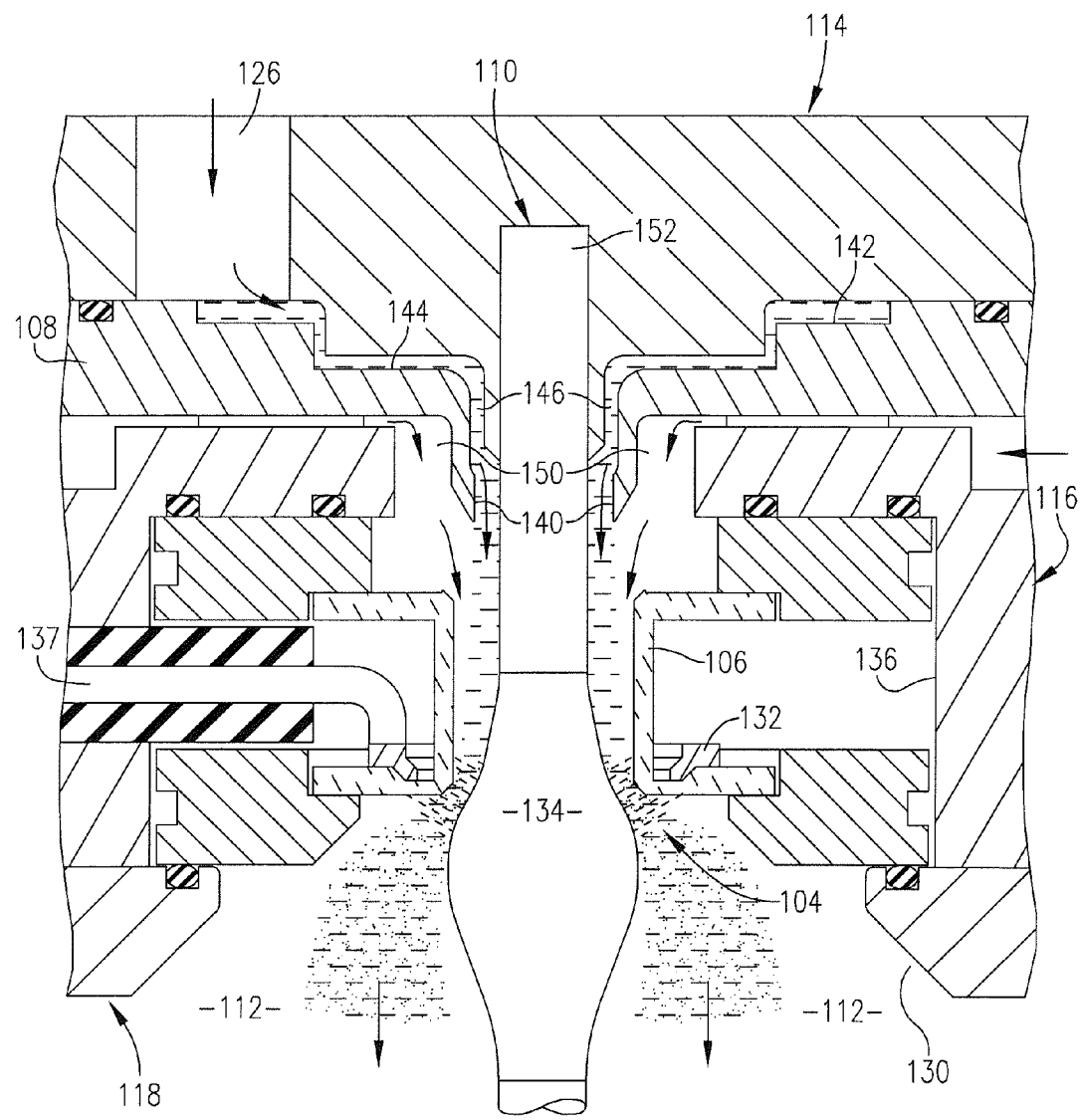
FIG. 11 is an enlarged view of the sectional view of the plasma eductor reactor from FIG. 9 highlighting an upper portion of a reactor chamber.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Referring to FIGS. 1-7, a plasma eductor reactor 10, constructed in accordance with at least a first embodiment of the current invention, is shown. The reactor 10 generally receives a gas and a liquid as inputs. The gas may be ionized to form a plasma which is injected into the liquid to create an effluent or product. The plasma eductor reactor 10 broadly comprises a housing 12, a top plate 14, a top cap 16, an electric field generator 18, a dielectric element 20, a flow spreader 22, a diffuser 24, a deflector 26, and a reactor chamber 28. The plasma eductor reactor 10 may also include a plurality of gaskets or seals, such as O-ring seals, that are positioned at the interfaces between various components of the reactor 10.

Positional and directional terms, such as "upper", "top", "lower", "bottom", and the like, are used herein to describe various aspects of the current invention as shown in the accompanying figures. While the figures depict the invention in a particular orientation, the invention may be utilized in virtually any orientation. The relationship between the components established by the terms still applies when the invention is utilized in an orientation other than that shown in the figures.

The housing 12 generally retains the components of the plasma eductor reactor 10, and its shape may be adapted to the system in which it is implemented. The housing may include additional components, such as a collar 30, that adapt the plasma eductor reactor 10 to the system in which it is implemented. In some embodiments, the housing may have a box shape with a plurality of sidewalls. In an exemplary embodiment, the housing 12 has a generally cylindrical shape with a circumferential sidewall 32 including an inner surface. The housing 12 may also include cutouts along an outer surface of the sidewall 32 to allow for fasteners to assemble the housing 12 to the top plate 14. In addition, the housing 12 may include a gas port 34 and a liquid port 36. The housing 12 may be constructed from metals, plastics, ceramics, or the like.

The top plate 14 and the top cap 16 generally retain a portion of the electric field generator 18. The top plate 14 may have a box shape with a plurality of sidewalls and an internal cavity 38 bounded by the sidewalls. The internal cavity 38 may be filled with dielectric materials, ceramics, polymers, gases, or the like to provide electrical isolation and suppress undesirable corona discharge from the electric field generator 18 to the top plate 14. The top cap 16 may be coupled to an upper surface of the top plate 14 and may be roughly disc-shaped with a central opening that contacts the internal cavity 38. The top cap 16 may also include an insulator positioned within the central opening.

The electric field generator 18 generates an electric field within the reactor chamber 28 and may include a first electrode 40 and a second electrode 42. The electrodes 40, 42 may be spaced apart, and the electric field may exist between the two electrodes 40, 42. Both electrodes 40, 42 may be connected to an external voltage supply which controls the characteristics of the electric field. The voltage supply may provide a range of approximately 5 kiloVolts (kV) AC to approximately 25 kV AC with an optional DC offset bias ranging from approximately 1 kV to approximately 10 kV. In various embodiments, the first electrode 40 may be connected to a variable voltage line, while the second electrode 42 may be connected to an electrical ground or neutral. The first electrode 40 may be annular or ring-shaped, although other shapes are possible, and may be constructed from a metal, such as iron, nickel, gold, copper, alloys thereof, or the like. The first electrode 40 may be located in the internal cavity 38 of the top plate 14. The first electrode 40 may also be connected to an electrical conductor 44 that extends to the exterior of the housing 12. The electrical conductor 44 may be shaped and sized to fit within the insulator in the central opening in the top cap 16. The second electrode 42 is generally shaped the same as the first electrode 40 and is positioned to align with the first electrode 40. In some embodiments, the second electrode 42 may be the diffuser 24. In other embodiments, the second electrode 42 may be a diffuser electrode ring 46 positioned within the diffuser 24, as described in more detail below. Given the shapes and orientation of the electrodes 40, 42, the electric field generated may be roughly cylindrical in shape.

The dielectric element 20 generally provides an insulating gap across which at least a portion of the electric field is established. The dielectric element 20 may be planar and disc-shaped, although other shapes are possible, and may be constructed from insulating dielectric material such as ceramics, polymers, or the like. An upper surface of the dielectric element 20 may be coupled to a lower surface of the top plate 14. In addition, the first electrode 40 may bonded, glued, or otherwise affixed to the upper surface of the dielectric element 20.

The flow spreader 22 generally supplies the gas to the reactor chamber 28. The flow spreader 22 may have a generally cylindrical shape with a circumferential sidewall 48 including an inner surface and an outer surface. The hollow interior of the flow spreader 22, bounded by the inner surface of the sidewall 48, may form a gas passageway 50. At a first end, the flow spreader 22 may include a radially outward extending flange 52. The outer surface may have a rounded corner between the sidewall 48 and the flange 52. Also at the first end of the flow spreader 22, the inner surface of the sidewall 48 may have a frustoconical cross-sectional shape from which gas exits the gas passageway 50 and the flow spreader 22. At an opposing second end of the flow spreader 22, gas may enter the gas passageway 50. The flow spreader 22 may be positioned opposite the dielectric element 20, such that there is a small space between the lower surface of the dielectric element 20 and a top of the flange 52. The flow spreader 22 may also be positioned concentrically with the electric field generator 18, such that the outer edge of the flange 52 is within the annular bounds of the first and second electrodes 40, 42.

The diffuser 24, in combination with the flow spreader 22, generally establishes a radial flow pattern for the liquid before ions are injected into the liquid. The diffuser 24 may also supply the liquid to the reactor chamber 28. The diffuser 24 may have a generally cylindrical shape with a circumferential sidewall 54 including an inner surface and an outer surface. The flow spreader 22 may be positioned within the hollow interior of the diffuser 24, such that the flow spreader 22 is concentric with the diffuser 24. There may a space between the outer surface of the sidewall 48 of the flow spreader 22 and the inner surface of the sidewall 54 of the diffuser 24 which forms a liquid passageway 56. Accordingly, the liquid passageway 56 may have an annular or ring cross-sectional shape. The top edge of the sidewall 54 may be rounded, arcuate, or curved between the inner surface and the outer surface. The bottom edge of the sidewall 54 may be coupled to a diffuser cap 58, which closes off one end of the liquid passageway 56, thereby forcing the liquid in the liquid passageway 56 to flow toward the top edge of the sidewall 54. The diffuser 24 may further include one or more liquid inlets 60 in the sidewall 54, near the bottom edge, that supply liquid to the liquid passageway 56.

Furthermore, the combination of the flow spreader 22 and the diffuser 24 may create an eductor with educting fluid exiting the eductor at the space between the flange 52 and the top edge of the diffuser sidewall 54. With the educting fluid exiting at a relatively higher flow velocity, a low pressure area surrounding the opening between the flange 52 and the sidewall 54 and adjacent to the flowing fluid is created, as given by Bernoulli's principle.

In some embodiments, the diffuser 24 may be constructed from electrically conductive materials, such as metals. In such embodiments, the diffuser 24, particularly the top edge of the sidewall 32, may form the second electrode 42 of the electric field generator 18. In other embodiments, the diffuser 24 may be constructed from non-conductive materials, such as plastics or ceramics. With these embodiments, the second electrode 42 may be formed by the diffuser electrode ring 46, made from electrically conductive material and positioned within a cavity located in the top edge of the sidewall 32 of the diffuser 24.

The deflector 26 generally directs the flow of the plasma and the liquid downward after the plasma is injected into the liquid. The deflector 26 may have an external shape which matches the external shape of the housing 12. The deflector 26 may be positioned between the housing 12 and the top plate 14, such that a lower surface of the deflector 26 may couple to an upper surface of the housing 12, and an upper surface of the deflector 26 may couple to the lower surface of the top plate 14. The deflector 26 may have a hollow interior bounded by an inner surface with openings along the upper surface and lower surface of the deflector 26. The inner surface may have a curved, arcuate, or rounded cross-sectional shape, such that the inner surface curves outward from the lower surface of the deflector 26 to approximately a vertical midpoint where the inner surface curves inward until the upper surface of the deflector 26. The opening along the lower surface of the deflector 26 may be larger than the opening on the upper surface. Furthermore, the opening on the upper surface of the deflector 26 may be covered by the lower surface of the dielectric element 20.

The reactor chamber 28 generally provides a setting for the gas to be ionized and injected into the liquid. The reactor chamber 28 may include an outer surface and an inner surface. The outer surface may be bounded by the lower surface of the dielectric element 20, the inner surface of the deflector 26, and the inner surface of the housing 12. The inner surface may be bounded by the outer surface and top edge of the diffuser 24 and the first end of the flow spreader 22 including the flange 52.

The plasma eductor reactor 10 may operate as follows. The gas port 34 on the housing 12 may be coupled to an external gas source, and the liquid port 36 may be coupled to an external pressurized liquid source. The gas may be supplied at approximately atmospheric pressure or may range up to approximately 100 pounds per square inch gage (psig). The gas may flow from the gas port 34 into the gas passageway 50 of the flow spreader 22. At the first end of the flow spreader 22, the gas may flow from the gas passageway 50 into the reactor chamber 28. The gas may flow radially outward from the gas passageway 50 in a 360-degree pattern in the space between the flange 52 and the dielectric element 20, thereby creating a gas layer. In the vicinity of the outer edge of the flange 52, the gas layer may encounter a low pressure area created by the flow of the liquid, as described below. As the gas continues to flow, it may pass between the first electrode 40 and the second electrode 42 and thus, through the electric field established by the electric field generator 18. As the gas passes through the electric field, the first electrode 40 may discharge which ionizes the gas and converts it into a stream of plasma with roughly laminar flow.

The characteristics of the electric field may be controlled by the external voltage supply which may provide a range of approximately 5 kiloVolts (kV) AC to approximately 25 kV AC with an optional DC offset bias ranging from approximately 1 kV to approximately 10 kV. The strength of the electric field is generally the greatest at the shortest distance between the first electrode 40 and the second electrode 42, which is typically at the peak of the top edge of the sidewall 54 of the diffuser 24 or at the point where the diffuser electrode ring 46 is placed in the diffuser 24.

The liquid may flow from the liquid port 36 through the liquid inlets 60 of the diffuser 24 and into the liquid passageway 56. Given the curvature of the bottom of the flange 52 and the curvature of the top edge of the diffuser 24, the liquid may exit the liquid passageway 56 and flow radially outward in a 360-degree pattern from the eductor structure of the flow spreader 22 and the diffuser 24 into the reactor chamber 28. The flow of the liquid from the eductor structure may create a low pressure area in the reactor chamber 28 around the outer edge of the flange 52. The liquid may then flow through the electric field as a stream with roughly laminar flow. The plasma stream may flow on top of the liquid stream. As the liquid and the plasma flow through the electric field, the plasma may be injected into the liquid to create a stream of effluent. As the effluent flows outward from the center of the reactor chamber 28, it encounters the inner surface of the deflector 26 which directs the effluent stream downward to the bottom of the reactor chamber 28. The effluent may exit the plasma eductor reactor 10 through the bottom of the reactor chamber 28.

The use of the flow spreader 22 and the diffuser 24 to create a radial stream of liquid and plasma allows for the use of a planar shaped dielectric element 20, which is easier to manufacture and aligns more easily to the liquid stream. The radial flow of the liquid also reduces the possibility of the liquid bridging the gap between the dielectric element 20 and the second electrode 42. The radial flow of the liquid may further create a significant pressure reduction in the gap which improves plasma stability, promotes uniformity of the discharge, reduces the turn-on voltage required for a given operating condition, and allows for recirculation of process gas without the addition of external compressors or pumps Referring to FIGS. 8-13, a second embodiment of the plasma eductor reactor 100 may broadly comprise a housing 102, an electric field generator 104, a dielectric element 106, a nozzle plate 108, a diffuser 110, and a reactor chamber 112. The plasma eductor reactor 100 may also include a plurality of gaskets or seals, such as O-ring seals, that are positioned at the interfaces between various components of the reactor 100.

The housing 102 generally retains the components of the plasma eductor reactor 100 and may include a top plate 114, a spacer plate 116, a support plate 118, a shell 120, and a bottom plate 122. The top plate 114, the spacer plate 116, the support plate 118, and the bottom plate 122 may each have a low-profile box shape, each one also having roughly the same footprint. The shell 120 may have a cylindrical shape. Each plate 114, 116, 118, 122 may include various through hole, opening, or cutout features. The top plate 114 may include an opening from an upper surface to a lower surface which serves as a liquid port 126. The spacer plate 116 may include an opening from a side surface to an upper surface which serves as a gas port 128. The support plate 118 may include an internal cavity 130 centrally located. The support plate 118 may also have a circular or ring-shaped feature on its lower surface to receive an upper edge of the shell 120, while the bottom plate 122 may have a circular or ring-shaped feature on its upper surface to receive a lower edge of the shell 120.

The electric field generator 104 is similar to the electric field generator 18 in function, but is different in terms of architecture. The electric field generator 104 may include a first electrode 132 and a second electrode 134, both of which are connected to the external voltage supply, wherein the first electrode 132 may be connected to a variable voltage line, while the second electrode 134 may be connected to an electrical ground or neutral. The first electrode 132 may be annular or ring-shaped, although other shapes are possible, and may be constructed from a metal, such as iron, nickel, gold, copper, alloys thereof, or the like. The first electrode 132 may be located in an internal cavity 136 of the spacer plate 116. The first electrode 132 may also be connected to an electrical conductor 137 that extends to the exterior of the housing 102. The electrical conductor 137 may be shaped and sized to fit within an insulator in an opening in the spacer plate 116. The second electrode 134 may be the diffuser 110, which is positioned within and concentric to the first electrode 132.

The dielectric element 106 generally provides an insulating gap across which at least a portion of the electric field is established. The dielectric element 106 may have a cylindrical shape with a circumferential sidewall 138 and may be constructed from insulating dielectric material such as ceramics, polymers, or the like. The dielectric element 106 may be positioned within the internal cavity 136 of the spacer plate 116. The first electrode 132 may be positioned at a lower end on an outer surface of the sidewall 138, such that the first electrode 132 surrounds, and is concentric with, the dielectric element 106.

The nozzle plate 108 generally establishes an axial flow pattern for the liquid and may be roughly disc-shaped with a central opening 140. The nozzle plate 108 may be positioned between the top plate 114 and the spacer plate 116. An exemplary nozzle plate 108 may include a plurality of outward extensions from the main disc. The nozzle plate 108 may further include an upper surface and a lower surface. The upper surface may include a first cutout impression 142 and a concentric second cutout impression 144. The first cutout impression 142 and the second cutout impression 144 may each be circular in shape with the second cutout impression 144 having a smaller diameter than the first cutout impression 142. The lower surface of the top plate 114 may have similar and complementary protruding features. The space between the lower surface of the top plate 114 and the upper surface of the nozzle plate 108 may form a liquid passageway 146. Liquid may flow from the liquid port 126 in the top plate 114 to the first cutout impression 142 and the second cutout impression 144 and through the central opening 140. The lower surface may include a downward extending flange 148 at the central opening 140. The space between the lower surface of the nozzle plate 108 and the upper surface of the spacer plate 116 may form a gas passageway 150. Gas may be received from the gas port 128 in the spacer plate 116 and may flow along the lower surface toward the flange 148 where the gas is directed downward to the internal cavity 136 of the spacer plate 116.

The diffuser 110 generally establishes an axial flow pattern for the liquid and the gas and may be elongated with a cylindrical shape and a circumferential sidewall 152. Approximately midway along the length of the diffuser 110, there may be a bulge, such that the diameter of the sidewall 152 increases and decreases in a roughly sinusoidal fashion. The diffuser 110 may be rigidly retained at an upper end by the top plate 114 and may extend through the internal cavity 130 of the support plate 118 into the interior of the shell 120. The diffuser 110 may be positioned in the center of the plasma eductor reactor 100 such that the longitudinal axis of the diffuser 110 is coaxial with the axis of the reactor 100, and the diffuser 110 is concentric with the dielectric element 106 and the first electrode 132 of the electric field generator 104. In various embodiments, the diffuser 110 may be constructed from electrically conductive materials, such as metals, and thus may serve as the second electrode 134 of the electric field generator 104.

The nozzle plate 108 in combination with the top plate 114 and the diffuser 110 may form an eductor structure, wherein liquid exiting the liquid passageway 146 at the central opening 140 of the nozzle plate 108 forms a low pressure area in the reactor chamber 112 adjacent to the liquid.

The reactor chamber 112 generally provides a setting for the gas to be ionized and injected into the liquid. The reactor chamber 112 may have an outer surface bounded by the flange 148, the internal cavity 136 of the spacer plate 116, an inner surface of the dielectric element 106, the internal cavity of the spacer plate 114, 116, 118, 122, and an internal surface of the shell 120. The reactor chamber 112 may have an inner surface that includes an outer surface of the diffuser 110.

The plasma eductor reactor 100 may operate as follows. The gas port 128 on the housing 102 may be coupled to an external gas source, and the liquid port 126 may be coupled to an external pressurized liquid source. The liquid may flow from the liquid port 126 along the liquid passageway 146 including onto the first cutout impression 142 and the second cutout impression 144 of the nozzle plate 108 and through the central opening 140, which may form the eductor structure. The flow of the liquid out of the eductor structure may create a low pressure area in the reactor chamber 112 adjacent to the liquid. The liquid may then flow axially along the entire circumference of the sidewall 152 of the diffuser 110 through the internal cavity 136 of the spacer plate 116. The liquid may pass the dielectric element 106 and flow between the first and second electrodes 132, 134 and thus, may flow through the electric field.

The gas may flow from the gas port 128 along the gas passageway 150 between the upper surface of the spacer plate 116 and the lower surface of the nozzle plate 108. The gas may enter the reactor chamber 112 at the flange 148 of the nozzle plate 108 into the low pressure area created by the stream of liquid. The gas may flow axially through the reactor chamber 112 on top of the stream of liquid. Thus, the gas may be positioned radially outward from the liquid. The gas may pass through the electric field while being ionized and converted into a stream of plasma. The electric field may have similar characteristics to those of the plasma eductor reactor 10 and may be at its strongest where the sidewall 152 of the diffuser 110 bulges or curves outward and the distance between the first and second electrodes 132, 134 is the smallest. As the liquid and the plasma flow through the electric field, the plasma may be injected into the liquid to create a stream of effluent. The effluent may pass through the shell 120 and may exit the reactor chamber 112 through an opening in the bottom plate 122.

Figure 14:
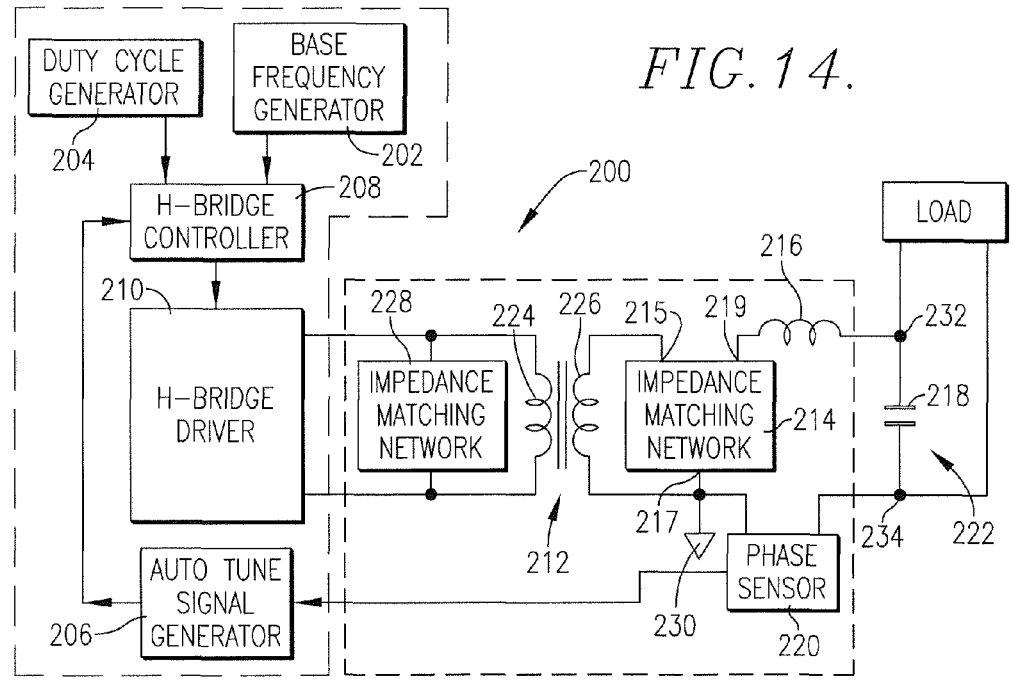
FIG. 14 is a block schematic drawing of a voltage supply circuit constructed in accordance with various embodiments of the current invention.

Referring to FIG. 14, a voltage supply circuit 200, constructed in accordance with another embodiment of the current invention, for supplying voltage to a plasma eductor reactor is shown. The voltage supply circuit 200 may broadly comprise a base frequency generator 202, a duty cycle generator 204, an auto tune signal generator 206, an H-bridge controller 208, an H-bridge driver 210, a transformer 212, a secondary impedance matching network 214, a gain inductor 216, a ballast capacitor 218, a phase sensor 220, and an output port 222.

The base frequency generator 202 may include electric or electronic circuits that generate alternating current (AC), sinusoidal, or periodic electronic signals comprising voltages and/or currents. The duty cycle generator 204 may include electric or electronic circuits that determine, control, or regulate the duty cycle of an electronic signal. The base frequency generator 202 and the duty cycle generator 204 in combination provide the proper timing signals to the H-bridge controller 208.

The H-bridge controller 208 may include electric or electronic circuits that receive input signals and generate voltages and/or currents that operate an H-bridge switching circuit. The H-bridge controller 208 may receive inputs from the base frequency generator 202 and the duty cycle generator 204. The H-bridge driver 210 may include discrete electrical or electromechanical components that are operable to change the polarity of the voltage and/or the current to an output. The H-bridge driver 210 may receive inputs from the H-bridge controller 208 to establish the timing for switching the polarity of the output.

The transformer 212 may include one or more transformers, as are known in the art. The transformer 212 may include a primary winding or primary 224 and a secondary winding or secondary 226. The primary 224 may be connected to the H-bridge driver 210. In some embodiments, the voltage supply circuit 200 may include an optional primary impedance matching circuit 228 connected in parallel with the H-bridge driver 210 to match the impedance thereof. The secondary impedance matching network 214 may include three terminals 215, 217, 219. A first terminal of the secondary 226 may be connected to terminal 215 of the secondary impedance matching network 214. In some embodiments, the secondary impedance matching network 214 includes a capacitor in series with an inductor between terminals 215 and 219 and a capacitor between terminal 217 and terminal 219. In other embodiments, the secondary impedance matching network 214 has terminal 215 shorted to terminal 219 and includes a capacitor or a capacitor in series with an inductor connected between terminal 217 and terminals 215, 219. There are other combinations of capacitors and inductors known to those familiar with resonant circuits which can accomplish this impedance matching function.

A second terminal of the secondary 226 and terminal 217 of the secondary impedance matching network 214 may be connected to a ground node 230. A terminal of the ballast capacitor 218 may be connected to the ground node 230 through the phase sensor 220. The phase sensor 220 may detect the phase of the transformer secondary circuit and may communicate that information back to the auto tune signal generator 206.

The output port 222 may be connected in parallel with the ballast capacitor 218 such that a first terminal 232 is connected to one side of the ballast capacitor 218 and a second terminal 234 may be connected to the ground node 230 through the phase sensor 220. The output port 222 may provide an electronic signal, particularly a voltage, to a load. In various embodiments, the load may be the plasma eductor reactor 10, 100 so that the voltage supply circuit provides the electronic signal to the electric field generator 18, 104. The first terminal 232 may be connected to the first electrode 40, 132 and the second terminal 234 may be connected to the second electrode 42, 134.

The voltage supply circuit 200 may function as follows. The base frequency generator 202 and the duty cycle generator 204 may provide timing signals to the H-bridge controller 208 which, in turn, provides switching signals to the H-bridge driver 210. The H-bridge driver 210 creates a low-level AC voltage at the primary 224 of transformer 212. An intermediate-level AC voltage is generated at the secondary 226 and across the secondary impedance matching network 214, which stores energy for instantaneous delivery to the gain inductor 216. The AC voltage increases at the first terminal 232 of the output port 222 due to the gain inductor 216, which has a high Q value. The AC voltage at the first terminal 232 may also increase as a function of the secondary 226 AC current and the capacitive impedance of the load relative to the second terminal 234.

In some embodiments, the H-bridge driver 210 is run periodically without actually firing the plasma to electrically stimulate any ions to enter the liquid. During the "on" time, the load (plasma eductor reactor 10, 100) may be turned on and off one or many times which has the effect of increasing the ionic concentration. The method of using "on" and "off" times this way depends on the process applied.

The voltage supply circuit 200 delivers high voltage AC power to the ballast capacitor 218 and the output port 222. In embodiments where the voltage supply circuit 200 is driving the electric field generator 18, 104 of the plasma eductor reactor 10, 100, when the plasma discharge initiation voltage is reached the plasma ignites. This happens on every half cycle of the AC wave form. Once ignited, the plasma absorbs energy from the voltage supply circuit 200 and the ballast capacitor 218. The energy provided by the ballast capacitor 218 increases the plasma on-time and increases the ion density in the plasma.

The resonant frequency of the voltage supply circuit 200 is largely set by the gain inductor 216 in series with the ballast capacitor 218 which is in parallel with the load (the plasma eductor reactor 10, 100). This combination is in series with the combination of the transformer 212 and the secondary impedance matching network 214. In systems, the resonant frequency is normally dominated by the gain inductor 216 and the combination of the ballast capacitor 218 and the load (the plasma eductor reactor 10, 100). Since the voltage supply circuit 200 runs in resonance with impedance matched components, the overall efficiency is improved over traditional pulse generated plasma drivers and the maximum voltage generated at the first terminal 232 of the output port 222 is not limited by the transformer 212 but by the losses in the components of the ballast capacitor 218 and the gain inductor 216. By using the gain inductor 216 to increase the voltage, the highest voltage in the voltage supply circuit 200 is limited to the single node between the gain inductor 216 and the output port 222. The voltage on the remaining components can be limited by careful selection to fractions of the high voltage node value. For example, for a plasma eductor reactor 10, 100 with plasma firing voltage in the range of 8-10 kV, the intermediate voltage may remain below 600 V and the drive voltage out of the H-bridge driver 210 is less than 100 V. However there are some applications in which a higher Intermediate and drive voltage might be desirable. The lower operating voltage ahead of the gain inductor 216 allows use of a low cost small, low turn's ratio, lower Q transformer 212 and simplified drive electronics resulting in significantly reduced component costs for the H-bridge driver 210 and matching network while maintaining good, efficient, high frequency performance.

Another advantage of a resonant system of the voltage supply circuit 200 is that when low loss components are selected for the ballast capacitor 218 and the gain inductor 216, the high voltage will increase (within certain limits) until the plasma fires and the load begins to absorb energy. This voltage following feature is very desirable when the physical characteristics of the gas and/or liquid in the plasma eductor reactor 10, 100 change dynamically during operation. As the pressure changes or the gas gap thickness changes, the firing voltage changes in response. The voltage supply circuit 200 has the capability of following this dynamic load in real time. The control of the overvoltage applied to the plasma eductor reactor 10, 100 can also be tailored to the system requirements. The relatively small inductances required in the resonant ballast capacitor 218 and gain inductor 216 allow higher frequency operation thereof. Since the H-Bridge components operate at much lower voltage than the ballast capacitor 218 and the gain inductor 216, switching losses are minimized and the operating frequency can be as high as practically desired to achieve the plasma densities or power input levels required by the plasma eductor reactor 10, 100. In this way control electronics are greatly simplified and cost is reduced. This design provides both high voltage and high frequency energy to the plasma process in a compact and low cost unit. The high frequency translates to high dv/dt (or rapid voltage rate of change) that is conducive to plasma initiation and propagation from the gas into the liquid surface.

The duty cycle generator 204 allows the H-bridge driver 210 to be cycled on and off to customize the plasma on time and off time, as described above. This allows power level adjustment independent of the ballast capacitor 218 and the gain inductor 216 resonant frequency and drive voltage to optimize the desired plasma characteristics. For instance, optimizing ozone formation in the case of oxygen feed gas involves a short plasma generating pulse (or pulses) and then a significant plasma off time (on the order of 10's of milliseconds) for optimum performance. For example using a 700 kiloHertz (kHz) resonant frequency in the ballast capacitor 218 and the gain inductor 216, the H-bridge driver 210 can be turned on for 6-12 microseconds (μs) and then turned off for 250 μs to allow ozone to form before the next on cycle. This may be modified by having the on time include two or more 6-12 μs on times with 4-20 μs rest times followed by a 250 μs off time. In addition, during the off time the load (the plasma eductor reactor 10, 100) may be stimulated by 1-4 μs on times which do not create a plasma but electrically stimulate the ions in a manner desirable to the process.

The auto-tune function is provided by the phase sensor 220 and auto tune signal generator 206. This unit allows the H-bridge controller 208 to lock the H-bridge driver 210 switching pulse to the phase of the ballast capacitor 218 and the gain inductor 216. This is critical for several reasons. First, the resonant frequency band is very narrow (less than 20 Hz in some cases) and is affected by the capacitance of the plasma eductor reactor 10, 100. This means that changes in the plasma eductor reactor 10, 100 or ambient temperature, the plasma eductor reactor 10, 100 gas pressure, and small drift in component characteristics over time can alter the resonant frequency enough to have significant impact on the ability of the ballast capacitor 218 and the gain inductor 216 to absorb energy from the transformer 212. Second, the capacitance fluctuation in within the plasma eductor reactor 10, 100 can occur rapidly leading to very rapid de-tuning and potentially damaging power reflections. Although the ballast capacitor 218 can mitigate the effects of this to some degree, to maintain the optimum resonant frequency on every half cycle, a phase locked system is desirable. The phase sensor 220 represents one effective approach to sensing the phase locking signal for the phase sensor 220 and auto tune signal generator 206 by employing a capacitive voltage divider with an optional parallel resistor to detect the phase of the ballast capacitor 218 and the gain inductor 216. This allows the real-time synchronization of H-bridge driver 210 to the ballast capacitor 218 and the gain inductor 216 resonant frequency on each half cycle (twice the operating frequency). As this cycle is less than 1 μs, physical changes in gas pressure, liquid level or other plasma eductor reactor 10, 100 conditions are effectively tuned out.

Figure 15:
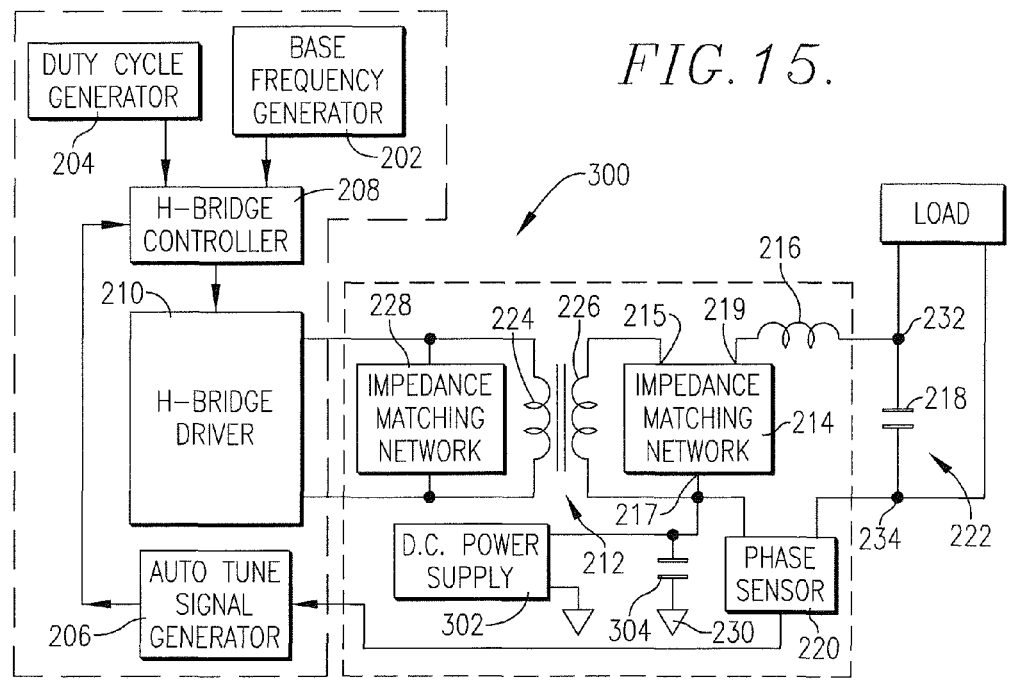
FIG. 15 is a block schematic drawing of a second embodiment of the voltage supply circuit.

Referring to FIG. 15, a second embodiment of the voltage supply circuit 300 is shown. The voltage supply circuit 300 is substantially the same as the voltage supply circuit 200 with the addition of the following components: a DC power supply 302 and an isolation capacitor 304.

The DC power supply 302 may include one or more direct current (DC) voltage sources as are known, batteries, or combinations thereof. The DC power supply 302 may be connected between the ground node 230 and the system ground potential or earth ground. The isolation capacitor 304 may be connected in parallel with the DC power supply 302 between the ground node 230 and system ground.

The voltage supply circuit 300 may operate substantially the same as the voltage supply circuit 200, except that the DC power supply 302 and the isolation capacitor 304 may vary the voltage of the ground node 230 to above or below the system ground. This enables the plasma eductor reactor 10, 100 to operate normally and provide a DC bias offset of either polarity for aiding the injection of ions into the liquid.

Figure 16:
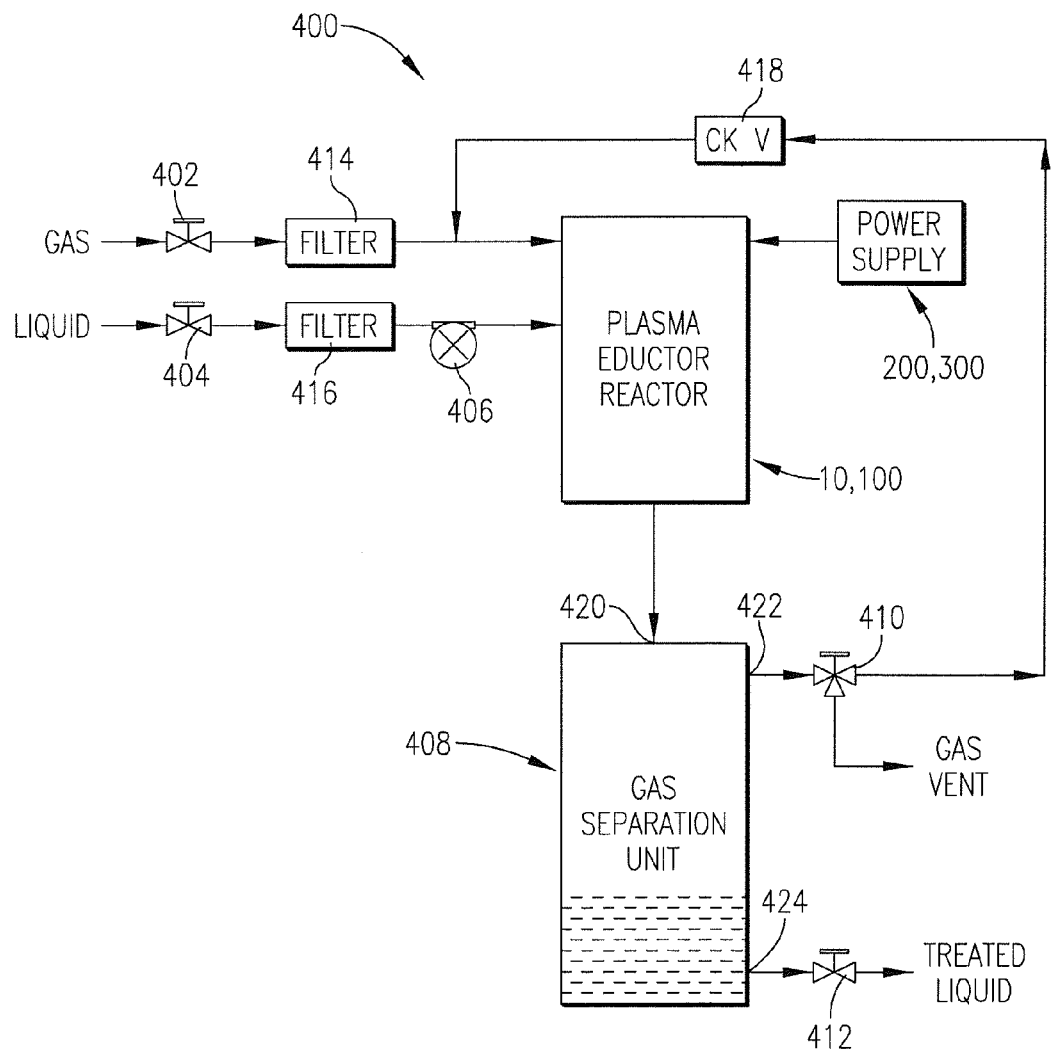
FIG. 16 is a block schematic drawing of a system for performing ozone water treatment constructed in accordance with various embodiments of the current invention.

Referring to FIG. 16, a system 400 for performing ozone water treatment, constructed in accordance with various embodiments of the current invention is shown. The system 400 may receive untreated raw water, or water-based liquids, and may inject oxygen radicals and ozone in order to disinfect the water. The system 400 may broadly comprise a gas inlet valve 402, a water inlet valve 404, a water flow sensor 406, the plasma eductor reactor 10, 100, the voltage supply circuit 200, 300, a gas separation unit 408, a gas output valve 410, and a water output valve 412. The system 400 may optionally comprise a gas filter 414, a water filter 416, and a check valve 418.

The gas inlet valve 402 generally controls the flow of gas coming into the system 400 and may include gas flow control elements or valves that are automatically adjusted, actuated, or manually adjusted. The gas inlet valve 402 may receive a supply of oxygen and may provide a stream of oxygen to the plasma eductor reactor 10, 100.

The gas filter 414 generally removes particulates from the oxygen/gas stream from the gas inlet valve 402. The gas filter 414 may include gas or air filtration components as are known. The gas filter 414 may be positioned in line with the flow of oxygen from the gas inlet valve 402 to the plasma eductor reactor 10.

The water inlet valve 404 generally controls the flow of water coming into the system 400 and may include liquid/fluid flow control elements or valves that are automatically adjusted, actuated, or manually adjusted. The water inlet valve 404 may receive a supply of water and may provide a stream of water to the water flow sensor 406.

The water filter 416 generally removes particulates from the water stream from the water inlet valve 404. The water filter 416 may include water or fluid filtration components as are known. The water filter 416 may be positioned in line with the flow of water from the water inlet valve 404 to the water flow sensor 406.

The water flow sensor 406 generally monitors the flow rate of water coming from the water inlet valve 404 and going to the plasma eductor reactor 10. The water flow sensor 406 may include flow rate sensors, monitors, meters, or the like, as are known in the art. The water flow sensor 406 may be positioned in line with the water inlet valve 404, or the optional water filter 416, and the plasma eductor reactor 10, 100.

The plasma eductor reactor 10, 100 generally receives the stream of oxygen and the stream of water and ionizes the oxygen to create a plasma of oxygen radicals and ozone which is injected into the water in order to disinfect it. Either embodiment of the plasma eductor reactor 10, 100 may be utilized. The stream of oxygen from either the gas inlet valve 402 or the gas filter 414 may be coupled to the gas port 34, 128 of the plasma eductor reactor 10, 100. The stream of water from the water flow sensor 406 may be coupled to the liquid port 36, 126 of the plasma eductor reactor 10, 100.

The voltage supply circuit 200, 300 generally supplies the voltage required for the electric field generator 18, 104 of the plasma eductor reactor 10, 100. Either embodiment of the voltage supply circuit 200, 300 may be utilized. The output port 222 of the voltage supply circuit 200, 300 may be coupled to the electric field generator 18, 104, such that the first terminal 232 is connected to the first electrode 40, 132 and the second terminal 234 is connected to the second electrode 42, 134.

The gas separation unit 408 generally separates the exhaust gas from the treated water that is output from the plasma eductor reactor 10, 100. The gas separation unit 408 may include a sealed tank of sufficient volume to handle the output of the plasma eductor reactor 10, 100. The gas separation unit 408 may also include controls for temperature or other parameters. The gas separation unit 408 may include an effluent input 420 which receives the treated water from the plasma eductor reactor 10, 100, a gas output 422 located near the top of the tank, and a water output 424 located near the bottom of the tank.

The gas output valve 410 generally controls the flow of gas coming out of the system 400 and may include gas flow control elements or valves that are automatically adjusted, actuated, or manually adjusted. The gas output valve 410 may receive gas from the gas separation unit 408 and may allow the gas to vent to the atmosphere. The gas output valve 410 may have an optional output that recirculates at least a portion of the gas back to the gas port 34, 128, of the plasma eductor reactor 10, 100.

The check valve 418 generally controls the flow of gas that recirculates to the plasma eductor reactor 10, 100. The check valve 418 may include gas flow control elements or valves that are unidirectional, or that allow gas to flow in one direction and not the opposite direction. The check valve 418 may receive gas from the gas output valve 410 and may supply gas to the gas port 34, 128, of the plasma eductor reactor 10, 100.

The system 400 may operate as follows. Oxygen gas may be supplied to the gas inlet valve 402 which delivers the gas either filtered (through the gas filter 414) or unfiltered to the gas port 34, 128 of the plasma eductor reactor 10, 100. Water, or water-based liquids, from a water treatment facility or the like, may be supplied to the water inlet valve 404 which delivers the water either filtered (through the water filter 416) or unfiltered to the liquid port 36, 126. The water may pass through the water flow sensor 406 which may measure the flow of the water and send a signal back to the water inlet valve 404 to adjust the water flow (by opening or closing the valve), if necessary.

The voltage supply circuit 200, 300 may perform as described above and may supply voltage to the electric field generator 18, 104. The plasma eductor reactor 10, 100 may receive the oxygen and water and, performing as described above, may ionize the oxygen to create a plasma of oxygen radicals and ozone which is injected into the water. The treated water, or effluent, and the plasma that was not injected exit the plasma eductor reactor 10, 100. The gas separation unit 408 may receive the treated water and the plasma and the two may separate, primarily through the action of gravity, with the treated water settling on the bottom of the gas separation unit 408 and the plasma flowing to the top. The treated water may be released into the environment or may undergo further processing. The plasma may be vented into the atmosphere or at least a portion of it may be fed back to the gas port 34, 128 to provide the source gas for the plasma eductor reactor 10, 100.

The system 400 described herein provides the following features and advantages. When utilized for water treatment or water purification, the system 400 generates short-lived but highly active oxygen radicals that are extremely reactive and capable of rapidly damaging cell membranes as well as proteins and/or lipids in viruses. The system 400 also generates longer lived ozone molecules that attack organics and damages cell membranes and have a more lasting effect. The exposure of the water film to the very high electric field (on the order of 50,000 V/cm) in the plasma eductor reactor 10, 100 enables an electro-poration mechanism to damage cell walls of microbes passing through it via the liquid and aids in sterilization. This can happen with or without the plasma being energized. In addition, the expansion of the gas when the plasma is energized creates high intensity ultrasonic energy in the gas which is directly coupled to the liquid and is intense enough to enable ultrasonic lysing of cell membranes. Since the pulse rise times are very short, sound travels through liquid very well, the layer is very thin, and the sonic energy wave in the liquid is significant throughout the layer and will aid destruction of cellular bodies. Furthermore, the ability of the system 400 to modify the high voltage pulses in such a way as to accentuate one or more of these features allows some degree of tailoring the process to a particular need, such as enhancing one treatment or purification mechanism vs. another.

Figure 17:
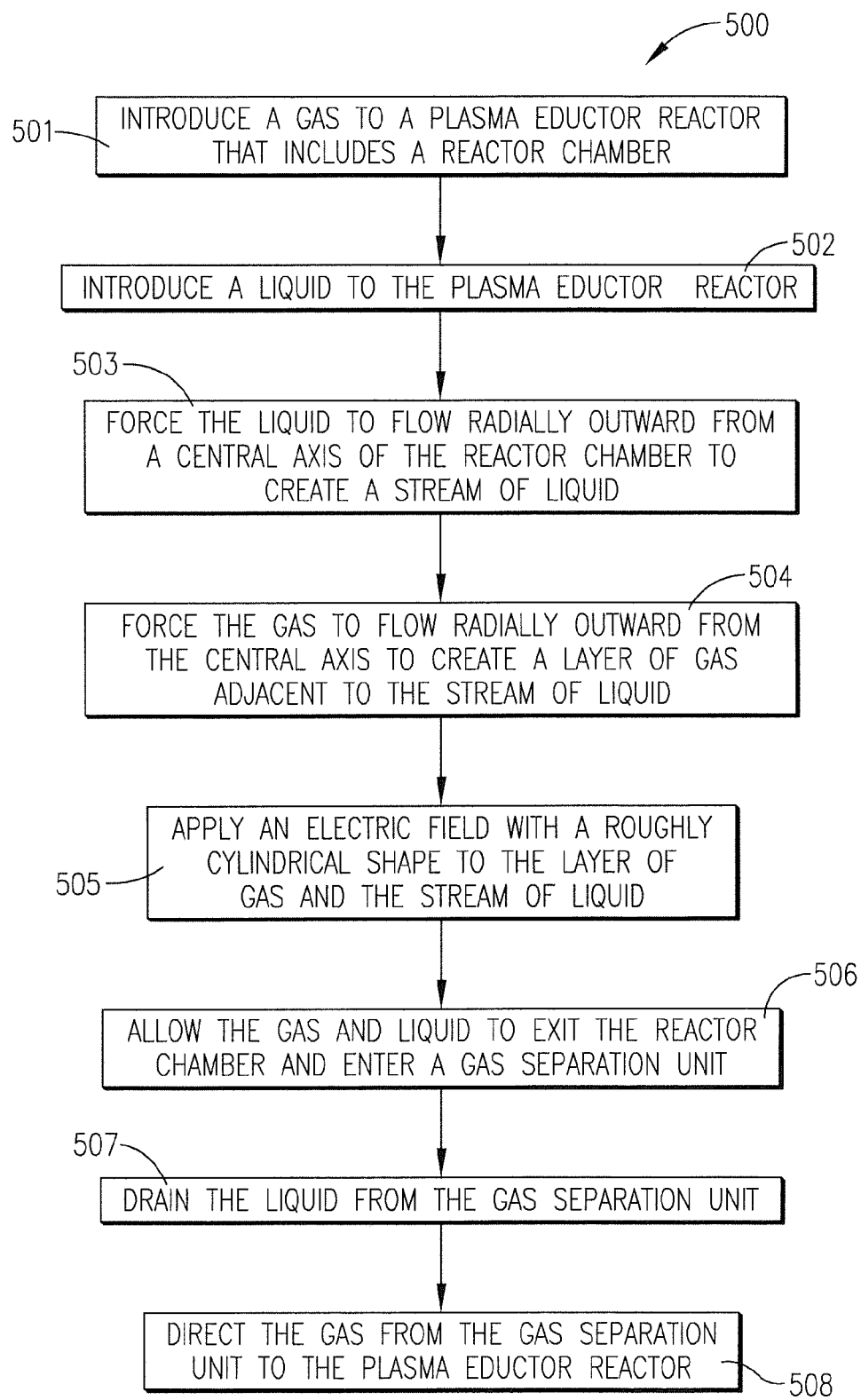
FIG. 17 is a flow diagram of a list of steps of a first method for performing a treatment of a liquid.

At least a portion of the steps of a first method 500 for performing a treatment of a liquid in accordance with various embodiments of the present invention is listed in FIG. 17. The steps may be performed in the order as shown in FIG. 17, or they may be performed in a different order. Furthermore, some steps may be performed concurrently as opposed to sequentially. In addition, some steps may be omitted.

Referring to step 501, a gas is introduced to a plasma eductor reactor 10 that includes a reactor chamber 28. The plasma eductor reactor 10 may also include a gas port 34 and a gas passageway 50 that couples with the reactor chamber 28.

Referring to step 502, a liquid is introduced to the plasma eductor reactor 10. The plasma eductor reactor 10 may also include a liquid port 36 and a liquid passageway 56 that couples with the reactor chamber 28.

Referring to step 503, the liquid is force to flow radially outward from a central axis of the reactor chamber 28 to create a stream of liquid. The plasma eductor reactor 10 may include a cylindrical flow spreader 22 positioned within a cylindrical diffuser 24 forming the liquid passageway 56 therebetween. The flow spreader 22 may include an outward extending flange 52 which forces the radial flow of the liquid.

Referring to step 504, the gas is forced to flow radially outward from the central axis to create a layer of gas adjacent to the stream of liquid. The flow spreader 22 may include a hollow interior shaft which forms the gas passageway 50. The opening of the gas passageway may be positioned in proximity to a planar dielectric element 20 which helps provide radial flow of the gas.

Referring to step 505, an electric field with a roughly cylindrical shape is applied to the layer of gas and the stream of liquid. The electric field may be applied with an electric field generator 18 including a first electrode 40 and a spaced apart second electrode 42, both of which may possess a roughly annular shape. The first electrode 40 may be positioned on one side of the dielectric element 20, while the second electrode 42 may be positioned within the reactor chamber 28. A voltage may be applied to the first electrode 40 and the second electrode 42. The voltage may have a range of approximately 5 kiloVolts (kV) AC to approximately 25 kV AC with an optional DC offset bias ranging from approximately 1 kV to approximately 10 kV.

Application of the electric field to the gas may ionize the gas to create a plasma. A portion of the plasma may be injected into the liquid under the influence of the electric field.

Referring to step 506, the gas and the liquid are allowed to exit the reactor chamber 28 and enter a gas separation unit 408. The gas separation unit 408 may include a tank with an internal chamber which receives the liquid and the gas.

Referring to step 507, the liquid is drained from the gas separation unit 408. The gas separation unit 408 may be coupled to a water output valve 412, through which the liquid flows.

Referring to step 508, the gas is directed from the gas separation unit 408 to the plasma eductor reactor 10. The gas separation unit 408 may be coupled to a gas output valve 410 which is connected to the gas port 34 of the plasma eductor reactor 10.

Figure 18:
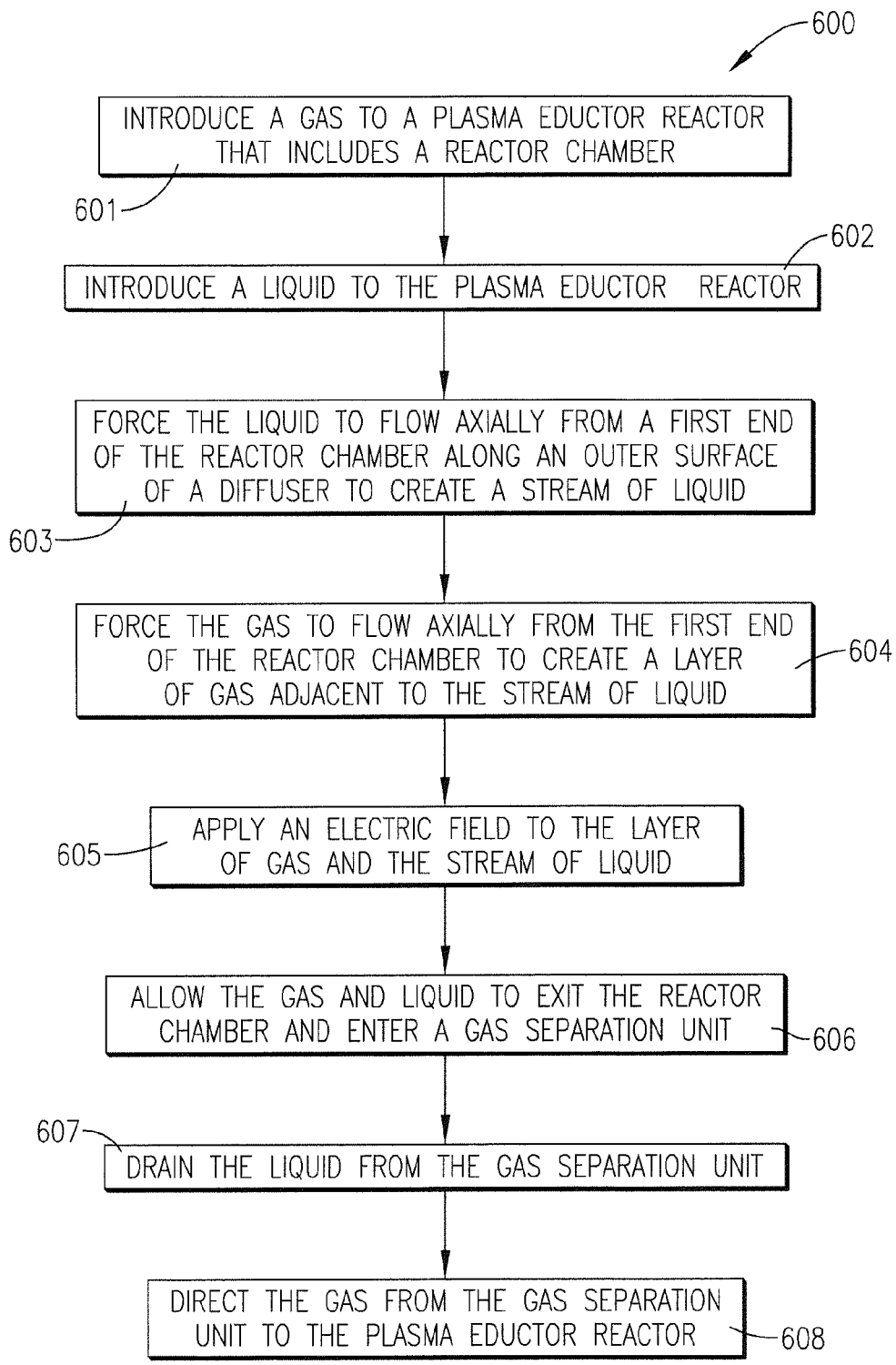
FIG. 18 is a flow diagram of a list of steps of a second method for performing a treatment of a liquid.

At least a portion of the steps of a second method 600 for performing a treatment of a liquid in accordance with various embodiments of the present invention is listed in FIG. 18. The steps may be performed in the order as shown in FIG. 18, or they may be performed in a different order. Furthermore, some steps may be performed concurrently as opposed to sequentially. In addition, some steps may be omitted.

Referring to step 601, a gas is introduced to a plasma eductor reactor 100 that includes a reactor chamber 112. The plasma eductor reactor 100 may also include a gas port 128 and a gas passageway 150 that couples with the reactor chamber 112.

Referring to step 602, a liquid is introduced to the plasma eductor reactor 100. The plasma eductor reactor 100 may also include a liquid port 126 and a liquid passageway 146 that couples with the reactor chamber 112.

Referring to step 603, the liquid is force to flow axially from a first end of the reactor chamber 112 along an outer surface of a diffuser 110 to create a stream of liquid. The plasma eductor reactor 100 may include a nozzle plate 108 with an upper surface that forms a portion of the liquid passageway 146. The nozzle plate 108 may include a central opening 140 which surrounds the diffuser 110. After it flows through the opening 140, the stream of liquid may surround the outer surface of the diffuser 110.

Referring to step 604, the gas is forced to flow axially from the first end of the reactor chamber 112 to create a layer of gas adjacent to the stream of liquid. The nozzle plate 108 may include a lower surface which forms a portion of the gas passageway 150. The gas may enter the reactor chamber 112 and flow axially above the stream of liquid.

Referring to step 605, an electric field is applied to the layer of gas and the stream of liquid. The electric field may be applied with an electric field generator 104 including a first electrode 132 with a roughly annular shape and a spaced apart second electrode 134. The first electrode 132 may be positioned on one side of a dielectric element 106 with a cylindrical shape that surrounds a portion of the reactor chamber 112 and the diffuser 110 therein. The second electrode 134 may be a part of or positioned within the diffuser 110. A voltage may be applied to the first electrode 132 and the second electrode 134. The voltage may have a range of approximately 5 kiloVolts (kV) AC to approximately 25 kV AC with an optional DC offset bias ranging from approximately 1 kV to approximately 10 kV.

Application of the electric field to the gas may ionize the gas to create a plasma. A portion of the plasma may be injected into the liquid under the influence of the electric field.

Referring to step 606, the gas and the liquid are allowed to exit the reactor chamber 112 and enter a gas separation unit 408. The gas separation unit 408 may include a tank with an internal chamber which receives the liquid and the gas.

Referring to step 607, the liquid is drained from the gas separation unit 408. The gas separation unit 408 may be coupled to a water output valve 412, through which the liquid flows.

Referring to step 608, the gas is directed from the gas separation unit 408 to the plasma eductor reactor 100. The gas separation unit 408 may be coupled to a gas output valve 410 which is connected to the gas port 128 of the plasma eductor reactor 100.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letter Patents include the following:

1. A plasma eductor reactor comprising:
   a housing including a reactor chamber internal to the housing;
   an electric field generator including a first electrode and a spaced apart second electrode configured to generate an electric field therebetween, the first and second electrodes each having an annular shape of roughly the same size and together producing a cylindrical electrical field;
   a flow spreader to supply a stream of gas to the reactor chamber, the flow spreader positioned within the reactor chamber concentrically with the first and second electrodes; and
   a diffuser to supply a stream of liquid to the reactor chamber, the diffuser positioned within the reactor chamber concentrically with the first and second electrodes and the flow spreader,
   wherein the stream of liquid and the stream of gas flow adjacent one another radially outward from a center of the reactor chamber and pass through the electric field.

2. The plasma eductor reactor of claim 1, further comprising a dielectric element planar in shape with a first surface and an opposing second surface and positioned at a top of the reactor chamber, wherein the first electrode is coupled to the first surface and the second electrode is spaced apart from the second surface.

3. The plasma eductor reactor of claim 1, wherein the flow spreader is cylindrical in shape with a circumferential sidewall and an outward extending flange at one end thereof, wherein the stream of gas flows along the interior of the sidewall.

4. The plasma eductor reactor of claim 3, wherein the diffuser is cylindrical in shape with a circumferential sidewall such that the sidewall of the flow spreader is positioned within the sidewall of the diffuser and the stream of liquid flows between the two sidewalls.

5. The plasma eductor reactor of claim 1, further comprising a deflector encircling the flow spreader and the diffuser to direct the streams of gas and liquid downward to exit the reactor chamber.

6. The plasma eductor reactor of claim 1, wherein the electric field generator ionizes the gas to create a plasma adjacent to the liquid, the plasma injected into the liquid forming an effluent.

7. The plasma eductor reactor of claim 6, wherein the effluent and the plasma exit the chamber at a bottom of the reactor chamber away from the flow spreader and the diffuser.

8. A system for performing ozone treatment, the system comprising:
   a voltage supply circuit including:
      an H-bridge driver configured to switch electrical polarity of a pair of terminals,
      an H-bridge controller configured to send a control signal to the H-bridge driver to control the switching of the electrical polarity,
      a transformer including a primary connected to the terminals of the H-bridge driver and a secondary,
      an impedance matching network connected in parallel with the secondary,
      an inductor connected in series with the secondary,
      an output port connected to at least one terminal of the secondary for delivering a voltage to a load, and
      a phase sensor to sense a phase of current through components connected to the secondary and an auto tune signal generator configured to send a signal to the H-bridge controller to set a phase value of the control signal to adjust the phase of the H-bridge driver to approximate a resonant frequency of the secondary; and
   a plasma eductor reactor including:
      a housing including a reactor chamber internal to the housing,
      an electric field generator including a first electrode and a spaced apart second electrode configured to generate an electric field therebetween, the first and second electrodes connected to the output port of the voltage supply circuit, each having an annular shape of roughly the same size and together producing a cylindrical electrical field,
      a flow spreader to supply a stream of oxygen to the reactor chamber, the flow spreader positioned within the reactor chamber concentrically with the first and second electrodes, and
      a diffuser to supply a stream of liquid to the reactor chamber, the diffuser positioned within the reactor chamber concentrically with the first and second electrodes and the flow spreader,
         wherein the stream of liquid and the stream of oxygen flow adjacent one another radially outward from a center of the reactor chamber and pass through the electric field.

9. The system of claim 8, wherein the electric field generator ionizes the oxygen to create a plasma of oxygen radicals and ozone that exist adjacent to the liquid.

10. The system of claim 9, further comprising a gas separation unit to receive treated liquid and the plasma from the plasma eductor reactor and to separate the plasma from the treated liquid such that the treated liquid may exit the system and at least a portion of the plasma may be recirculated to the plasma eductor reactor.

11. The system of claim 8, wherein the flow spreader is cylindrical in shape with a first circumferential sidewall and an outward extending flange at one end thereof, such that the stream of gas flows along the interior of the sidewall and the diffuser is cylindrical in shape with a second circumferential sidewall such that the first sidewall is positioned within the second sidewall and the stream of liquid flows between the two sidewalls.

12. The system of claim 8, wherein the impedance matching network includes a capacitor.

13. The system of claim 12, wherein the impedance matching network includes an inductor in series with the capacitor.

14. A system for performing a treatment of a liquid, the system comprising:
   a voltage supply circuit including:
      a driver configured to switch electrical polarity of a pair of terminals,
      a controller configured to send a control signal to the driver to control the switching of the electrical polarity,
      a transformer including a primary connected to the terminals of the driver and a secondary,
      an impedance matching network connected in parallel with the secondary,
      an inductor connected in series with the secondary,
      an output port connected to at least one terminal of the secondary for delivering a voltage to a load, and
      a phase sensor to sense a phase of current through components connected to the secondary and an auto tune signal generator configured to send a signal to the controller to set a phase value of the control signal to adjust the phase of the driver to approximate a resonant frequency of the secondary; and
   a plasma eductor reactor including:
      a housing including a reactor chamber internal to the housing,
      an electric field generator including a first electrode and a spaced apart second electrode configured to generate an electric field therebetween, the first and second electrodes connected to the output port of the voltage supply circuit, each having an annular shape of roughly the same size and together producing a cylindrical electrical field,
      a flow spreader to supply a stream of gas to the reactor chamber, the flow spreader positioned within the reactor chamber concentrically with the first and second electrodes, and
      a diffuser to supply a stream of liquid to the reactor chamber, the diffuser positioned within the reactor chamber concentrically with the first and second electrodes and the flow spreader,
         wherein the stream of liquid and the stream of gas flow adjacent one another radially outward from a center of the reactor chamber and pass through the electric field.

15. The system of claim 14, wherein the electric field generator ionizes the gas to create a plasma that exists adjacent to the liquid.

16. The system of claim 15, further comprising a gas separation unit to receive treated liquid and the plasma from the plasma eductor reactor and to separate the plasma from the treated liquid such that the treated liquid may exit the system and at least a portion of the plasma may be recirculated to the plasma eductor reactor.

17. The system of claim 14, wherein the flow spreader is cylindrical in shape with a first circumferential sidewall and an outward extending flange at one end thereof, such that the stream of gas flows along the interior of the sidewall and the diffuser is cylindrical in shape with a second circumferential sidewall such that the first sidewall is positioned within the second sidewall and the stream of liquid flows between the two sidewalls.

18. The system of claim 14, wherein the impedance matching network includes a capacitor.

19. The system of claim 18, wherein the impedance matching network includes an inductor in series with the capacitor.

\* \* \* \* \*